United States Patent
Chujoh et al.

(10) Patent No.: US 12,363,292 B2
(45) Date of Patent: Jul. 15, 2025

(54) VIDEO CODING APPARATUS AND DECODING APPARATUS

(71) Applicant: SHARP KABUSHIKI KAISHA, Sakai (JP)

(72) Inventors: Takeshi Chujoh, Sakai (JP); Tomohiro Ikai, Sakai (JP); Yukinobu Yasugi, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 53 days.

(21) Appl. No.: 18/413,291

(22) Filed: Jan. 16, 2024

(65) Prior Publication Data
US 2024/0251077 A1    Jul. 25, 2024

(30) Foreign Application Priority Data
Jan. 20, 2023    (JP) .................................. 2023-007390

(51) Int. Cl.
*H04N 19/117*    (2014.01)
*H04N 19/124*    (2014.01)
*H04N 19/136*    (2014.01)
*H04N 19/184*    (2014.01)
*H04N 19/186*    (2014.01)
(Continued)

(52) U.S. Cl.
CPC ......... *H04N 19/117* (2014.11); *H04N 19/124* (2014.11); *H04N 19/136* (2014.11); *H04N 19/184* (2014.11); *H04N 19/186* (2014.11); *H04N 19/42* (2014.11); *H04N 19/70* (2014.11)

(58) Field of Classification Search
CPC .. H04N 19/117; H04N 19/124; H04N 19/136; H04N 19/184; H04N 19/186; H04N 19/42; H04N 19/70
See application file for complete search history.

(56) References Cited

FOREIGN PATENT DOCUMENTS

WO    WO-2024147066 A1 *    7/2024    ........... H04N 19/132
WO    WO-2025006535 A2 *    1/2025    ........... H04N 19/117

OTHER PUBLICATIONS

Sachin Deshpande, "AHG9: On NNPFC Auxiliary Input Information", JVET-AD0065-v1, Joint Video Experts Team(JVET) of ITU-T SG 16 WP 3 And ISO/IEC JTC 1/SC 29, 30th Meeting, Antalya, TR, Apr. 21, 2023-Apr. 28, 2023, m6268214, XP030308654, [retrieved on Apr. 14, 2023].

(Continued)

*Primary Examiner* — Jae N Noh
(74) *Attorney, Agent, or Firm* — ScienBiziP, P.C.

(57) ABSTRACT

In a video coding and decoding method, in a case that a transmission rate is low, image quality is deteriorated due to coding distortion, but the image quality can be improved owing to post-filter processing using a neural network. However, a problem is that there may be no method of defining a strength control value to be input in the post-filter processing. A video decoding apparatus according to an aspect of the present invention includes an image decoding apparatus that generates a decoded image, and a post-filter processing apparatus that performs post-filter processing on the decoded image. In accordance with an input format for luminance and chrominance of the decoded image to be input in the post-filter processing, a strength control value obtained in a process of generating the decoded image is transformed, and the post-filter processing is performed.

8 Claims, 11 Drawing Sheets

(51) Int. Cl.
*H04N 19/42* (2014.01)
*H04N 19/70* (2014.01)

(56) References Cited

OTHER PUBLICATIONS

Chujoh T et al., "AHG9: On comments for the draft of VSEI", JVET-AD0078-v2, Joint Video Experts Team (JVET) of ITU-T SG 16 WP 3 And ISO/IEC JTC 1/SC 29, 30th Meeting, Antalya, TR, Apr. 21, 2023-Apr. 28, 2023, m62696, XP030308676, [retrieved on Apr. 16, 2023].

Chujoh T et al., "AHG9: On bugfix for NNPFC and NNPFA SEI messages", JVET-AC0047-v2, Joint Video Experts Team(JVET) of ITU-T SG 16 WP 3 And ISO/IEC JTC 1/SC 29, 29th Meeting, by Teleconference, Jan. 11, 2023-Jan. 20, 2023, m61591, XP030306477, [retrieved on Jan. 10, 2023].

Sachin Deshpande, "AHG9: Comments on Neural-network Post-filter Characteristics SEI Message", Document: JVET-AC0061-v2, Joint Video Experts Team (JVET), of ITU-T SG 16 WP 3 and ISO/IEC JTC 1/SC 29, 29th Meeting, by teleconference, Jan. 11-20, 2023.

"Information technology—MPEG video technologies—Part 7: Versatile supplemental enhancement information messages for coded video bitstreams, Amendment 1: Additional SEI messages", ISO/IEC JTC 1/SC 29 /WG 5 N 158, Date: Nov. 10, 2022, Text of ISO/IEC 23002-7:2022/DAM 1.

* cited by examiner

| nn_post_filter_characteristics( payloadSize ) { | Descriptor |
|---|---|
|   nnpfc_id | ue(v) |
|   nnpfc_mode_idc | ue(v) |
|   if( nnpfc_mode_idc == 1 ) { | |
|     while( !byte_aligned( ) ) | |
|       nnpfc_reserved_zero_bit_a | u(1) |
|     nnpfc_tag_uri | st(v) |
|     nnpfc_uri | st(v) |
|   } | |
|   nnpfc_formatting_and_purpose_flag | u(1) |
|   if( nnpfc_formatting_and_purpose_flag ) { | |
|     nnpfc_purpose | ue(v) |
|     /* input and output formatting */ | |
|     if( nnpfc_purpose == 2 \|\| nnpfc_purpose == 4 ) | |
|       nnpfc_out_sub_c_flag | u(1) |
|     if( nnpfc_purpose == 3 \|\| nnpfc_purpose == 4 ) { | |
|       nnpfc_pic_width_in_luma_samples | ue(v) |
|       nnpfc_pic_height_in_luma_samples | ue(v) |
|     } | |
|     if( nnpfc_purpose == 5 ) { | |
|       nnpfc_num_input_pics_minus2 | ue(v) |
|       for( i = 0; i <= nnpfc_num_input_pics_minus2; i++ ) | |
|         nnpfc_interpolated_pics[ i ] | ue(v) |
|     } | |
|     .... | |
|     nnpfc_inp_format_idc | ue(v) |
|     if( nnpfc_inp_format_idc == 1 ) { | |
|       nnpfc_inp_tensor_luma_bitdepth_minus8 | ue(v) |
|       nnpfc_inp_tensor_chroma_bitdepth_minus8 | ue(v) |
|     } | |
|     nnpfc_inp_order_idc | ue(v) |
|     nnpfc_auxiliary_inp_idc | ue(v) |
|     .... | |
|   } | |
|   /* ISO/IEC 15938-17 bitstream */ | |
|   if( nnpfc_mode_idc == 0 ) { | |
|     while( !byte_aligned( ) ) | |
|       nnpfc_reserved_zero_bit_b | u(1) |
|     for( i = 0; more_data_in_payload( ); i++ ) | |
|       nnpfc_payload_byte[ i ] | b(8) |
|   } | |
| } | |

FIG. 7

| nn_post_filter_activation( payloadSize ) { | Descriptor |
|---|---|
|    nnpfa_target_id | ue(v) |
|    nnpfa_cancel_flag | u(1) |
|    if( !nnpfa_cancel_flag ) { | |
|       nnpfa_persistence_flag | u(1) |
|    } | |
| } | |

FIG. 8

| sei_payload( payloadType, payloadSize ) { | Descriptor |
|---|---|
|   if( nal_unit_type == PREFIX_SEI_NUT ) | |
|     ... | |
|     else if( payloadType == 210 ) | |
|       nn_post_filter_characteristics( payloadSize ) | |
|     else if( payloadType == 211 ) | |
|       nn_post_filter_activation( payloadSize ) | |
|     ... | |
|     else | |
|       reserved_message( payloadSize ) | |
|     ... | |

FIG. 9

VIDEO CODING APPARATUS AND DECODING APPARATUS

RELATED APPLICATIONS

This application claims the benefit of Japanese Patent Application No. 2023-007390, filed on Jan. 20, 2023, which is hereby incorporated by reference in its entirety.

TECHNICAL FIELD

Embodiments of the present invention relate to a video coding apparatus and a decoding apparatus.

BACKGROUND ART

A video coding apparatus which generates coded data by encoding a video, and a video decoding apparatus which generates decoded images by decoding the coded data are used for efficient transmission or recording of videos.

Specific video coding schemes include, for example, H.264/AVC and an H.265/High-Efficiency Video Coding (HEVC) scheme, and the like.

In such a video coding scheme, images (pictures) constituting a video are managed in a hierarchical structure including slices obtained by splitting an image, Coding Tree Units (CTUs) obtained by splitting a slice, units of coding (which may also be referred to as Coding Units (CUs)) obtained by splitting a coding tree unit, and Transform Units (TUs) obtained by splitting a coding unit, and are coded/decoded for each CU.

In such a video coding scheme, usually, a prediction image is generated based on a local decoded image that is obtained by encoding/decoding an input image (a source image), and prediction errors (which may be referred to also as "difference images" or "residual images") obtained by subtracting the prediction image from the input image are encoded. Generation methods of prediction images include an inter-picture prediction (inter prediction) and an intra-picture prediction (intra prediction).

In addition, the recent technology for video coding and decoding includes NPL 1. NPL 1 defines a Supplemental Enhancement Information (SEI) message for simultaneously transmitting property of an image, a display method, timing, and the like with coded data, and discloses SEI for transmitting topology and parameters of a neural network filter used as a post-filter in a randomly accessible unit. The SEI for transmitting whether post-filter processing is performed in a unit of a picture is disclosed.

As a method for improving NPL 1, NPL 2 describes a method of separately defining bit-depths for luminance and chrominance in a case that input tensors of a neural network are integer values.

CITATION LIST

Non Patent Literature

NPL 1: Text of ISO/IEC 23002-7:202x (2nd Ed.) DAM1 Additional SEI messages, November 2022.
NPL 2: AHG9: Comments on Neural-network Post-filter Characteristics SEI Message, JVET-AC0061, January 2023.

SUMMARY OF INVENTION

Technical Problem

In the method disclosed in NPL 1, the following problem is present: in a case that an integer value is used in a format of an input value of an input tensor of post-filter processing, a value of a strength control value StrengthControlVal input to the input tensor is defined only as a real number value between 0 and 1 obtained from decoded information, and processing with an unsigned integer cannot be performed.

In the method disclosed in NPL 2, in a case that an integer value is used in a format of an input value of an input tensor of post-filter processing, bit-depths are independently defined for luminance and chrominance. However, similarly to NPL 1, the following problem is present: StrengthControlVal remains a real number value, and there is no method of applying the value of StrengthControlVal to accuracy of input tensors different between luminance and chrominance.

Solution to Problem

A video decoding apparatus according to an aspect of the present invention includes an image decoding apparatus configured to decode coded data to generate a decoded image, and a post-filter processing apparatus configured to perform post-filter processing on the decoded image. In accordance with an input format for luminance and chrominance of the decoded image to be input in the post-filter processing, a strength control value obtained in a process of generating the decoded image is transformed, and the post-filter processing is performed.

In the video decoding apparatus, the strength control value independent for the luminance and the chrominance may be generated. Information indicating the input format indicating whether it is an integer or a real number, luminance bit-depth, and chrominance bit-depth may be decoded from the coded data. In a case that the information indicates an integer, using the luminance bit-depth and the chrominance bit-depth, the strength control value may be transformed, and the post-filter processing may be performed.

In the video decoding apparatus, the strength control value independent for the luminance and the chrominance may be generated. In accordance with the input format for the luminance and the chrominance of the decoded image to be input in the post-filter processing, the strength control value may be transformed, and the post-filter processing may be performed.

A video coding apparatus according to an aspect of the present invention includes an image coding apparatus configured to encode an input image, a supplemental enhancement information generating apparatus configured to generate information for determining an input format of a decoded image for luminance and chrominance to be input in post-filter processing and an input format of a strength control value obtained in a process of generating a local decoded image output from the image coding apparatus, and a supplemental enhancement information coding apparatus that encodes the supplemental enhancement information.

Advantageous Effects of Invention

With such a configuration, the problem in that there is no method of defining the strength control value to be input in the post-filter processing can be solved.

BRIEF DESCRIPTION OF DRAWINGS

FIG. 7 is a diagram illustrating a configuration example of a syntax table of neural network post-filter characteristics (NNPFC) SEI defining supplemental enhancement information of the present embodiment.

FIG. 8 is a diagram illustrating syntax of neural network post-filter activation (NNPFA) SEI.

FIG. 9 is a diagram illustrating syntax of an SEI payload being a container of an SEI message.

DESCRIPTION OF EMBODIMENTS

First Embodiment

Hereinafter, an embodiment of the present invention will be described with reference to the drawings.

Figure 1:
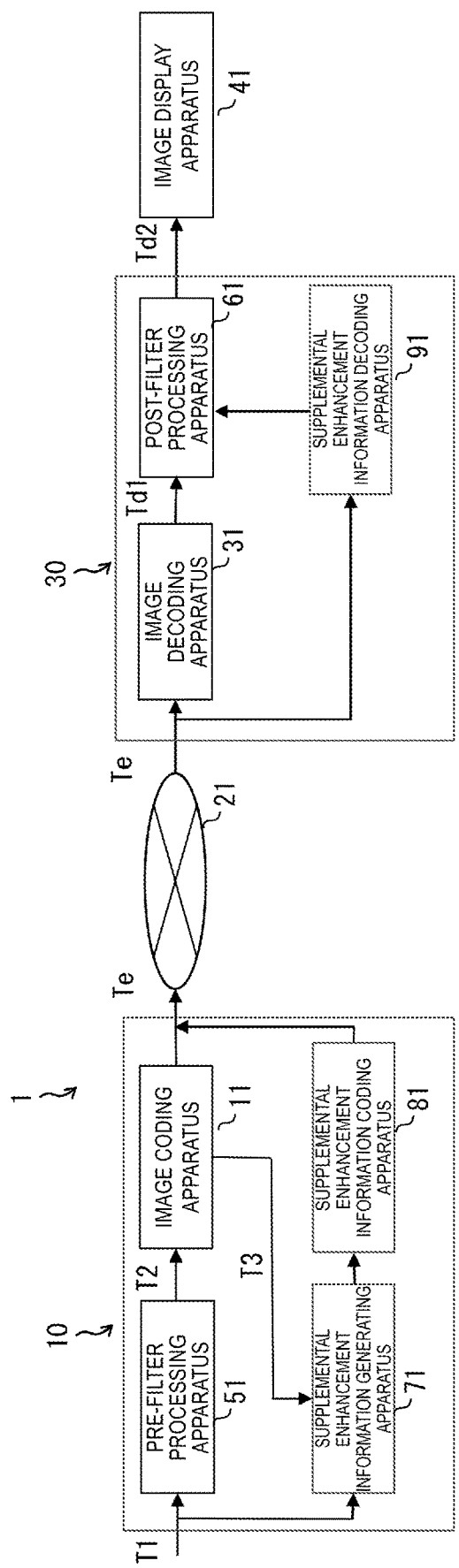
FIG. 1 is a schematic diagram illustrating a configuration of a video transmission system according to the present embodiment.

FIG. 1 is a schematic diagram illustrating a configuration of a video transmission system according to the present embodiment.

The video transmission system 1 is a system in which coded data obtained by encoding an image is transmitted, the transmitted coded data is decoded, and thus the coded data is displayed. The video transmission system 1 includes a video coding apparatus 10, a network 21, a video decoding apparatus 30, and an image display apparatus 41.

The video coding apparatus 10 includes an image coding apparatus (image coder) 11, a supplemental enhancement information generating apparatus (supplemental enhancement information generating unit) 71, a supplemental enhancement information coding apparatus (supplemental enhancement information coder) 81, and a pre-filter processing apparatus (pre-filter processing unit) 1001.

The video coding apparatus 10 generates a pre-filter processing image T2 from an input video T1 in a pre-filter processing apparatus 51, performs compression and encoding of the image in the image coding apparatus 11 and analyzes the input video T1 and a local decoded image T3 of the image coding apparatus 11, generates supplemental enhancement information for inputting to a post-filter processing apparatus 61 in the supplemental enhancement information generating apparatus 71, performs encoding in the supplemental enhancement information coding apparatus 81 to generate coded data Te, and transmits the coded data Te out to the network 21.

The video decoding apparatus 30 includes an image decoding apparatus (image decoder) 31, a supplemental enhancement information decoding apparatus (supplemental enhancement information decoder) 91, and a post-filter processing apparatus (post-filter processing unit) 61.

The video decoding apparatus 30 decodes the coded data Te received from the network 21 in the image decoding apparatus 31 and the supplemental enhancement information decoding apparatus 91, performs post-filter processing on a decoded image Td1 in the post-filter processing apparatus 61 using supplemental enhancement information, and outputs a post-filter decoded image Td2 to the image display apparatus 41.

Note that the post-filter processing apparatus 61 may directly output the decoded image Td1 without performing the post-filter processing using the supplemental enhancement information.

The image display apparatus 41 displays all or a part of the post-filter decoded image Td2 output from the post-filter processing apparatus 1002. For example, the image display apparatus 41 includes a display device such as a liquid crystal display and an organic Electro-luminescence (EL) display. Forms of the display include a stationary type, a mobile type, an HMD type, and the like. In a case that the image decoding apparatus 31 has a high processing capability, an image having high image quality is displayed, and in a case that the apparatus has a lower processing capability, an image which does not require high processing capability and display capability is displayed.

The network 21 transmits the coded supplemental enhancement information and the coded data Te to the image decoding apparatus 31. A part or all of the coded supplemental enhancement information may be included in the coded data Te as supplemental enhancement information SEI. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. The network 21 may be substituted by a storage medium in which the coded data Te is recorded, such as a Digital Versatile Disc (DVD) (trade name) or a Blu-ray Disc (BD) (trade name).

As an example of a specific embodiment, in the pre-filter processing, an input image may be reduced, and regarding the supplemental enhancement information, in the post-filter processing, the supplemental enhancement information for neural network processing for enlarging a decoded image through super-resolution processing based on a neural network may be coded and decoded.

As another example of a specific embodiment, in the pre-filter processing, processing may not be particularly performed, and regarding the supplemental enhancement information, in the post-filter processing, the supplemental enhancement information for neural network processing for restoring a decoded image into an input video through image restoration processing based on a neural network may be coded and decoded.

In such a configuration, a framework for enabling efficient encoding and decoding of the supplemental enhancement information is provided.

Operator

Operators used in the present specification will be described below.

$>>$ is a right bit shift, $<<$ is a left bit shift, & is a bitwise AND, | is a bitwise OR, |= is an OR assignment operator, and || indicates a logical sum.

x?y: z is a ternary operator that takes y in a case that x is true (other than 0) and takes z in a case that x is false (0).

Clip3(a, b, c) is a function to clip c in a value of a to b, and a function to return a in a case that c is smaller than a (c<a), return b in a case that c is greater than b (c>b), and return c in the other cases (provided that a is smaller than or equal to b (a<=b)).

abs (a) is a function that returns the absolute value of a.

Int (a) is a function that returns the integer value of a.

floor (a) is a function that returns the maximum integer equal to or less than a.

ceil (a) is a function that returns the minimum integer equal to or greater than a.

a/d represents division of a by d (round down decimal places).

Structure of Coded Data Te

Prior to the detailed description of the image coding apparatus 11 and the image decoding apparatus 31 according to the present embodiment, a data structure of the coded data Te generated by the image coding apparatus 11 and decoded by the image decoding apparatus 31 will be described with reference to FIG. 2 and FIG. 3.

Figure 2:
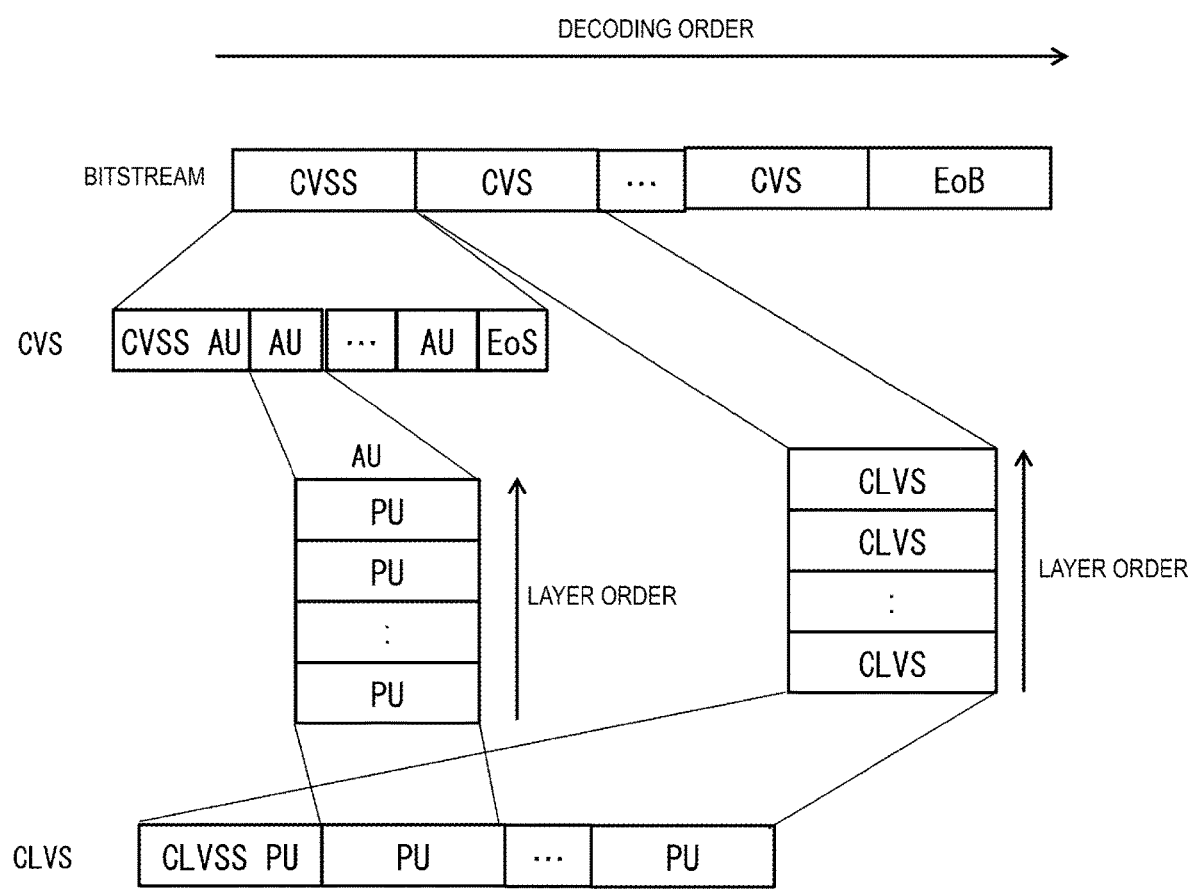
FIG. 2 is a diagram illustrating a hierarchical structure of coded data.

The coded data Te is a bitstream including multiple Coded Video Sequences (CVSs) and an End of Bitstream (EoB) NAL unit illustrated in FIG. 2. The CVS includes multiple Access Units (AUS) and an End of Sequence (ES) NAL unit. The AU at the start of the CVS is referred to as a Coded Video Sequence Start (CVSS) AU. A unit obtained by splitting the CVS for each layer is referred to as a Coded Layer Video Sequence (CLVS). The AU includes Picture Units (PUs) of one or multiple layers at the same output time. In a case that a Multilayer coding scheme is not adopted, the AU includes one PU. The PU is a unit of coded data of one decoded picture including multiple NAL units. The CLVS includes PUs of the same layer, and the PU at the start of the CLVS is referred to as a Coded Layer Video Sequence Start (CLVSS) PU. The CLVSS PU is limited to the PU including randomly accessible Intra Random Access Pictures (IRAP) or Gradual Decoder Refresh Picture (GDR). The NAL unit includes a NAL unit header and Raw Byte Sequence Payload (RBSP) data. The NAL unit header includes, subsequently to 0 data of 2 bits, nuh_layer_id of 6 bits indicating a layer value, nuh_unit_type of 5 bits indicating a NAL unit type, and nuh_temporal_id_plus1 of 3 bits of a value obtained by adding 1 to a Temporal ID value.

Figure 3:
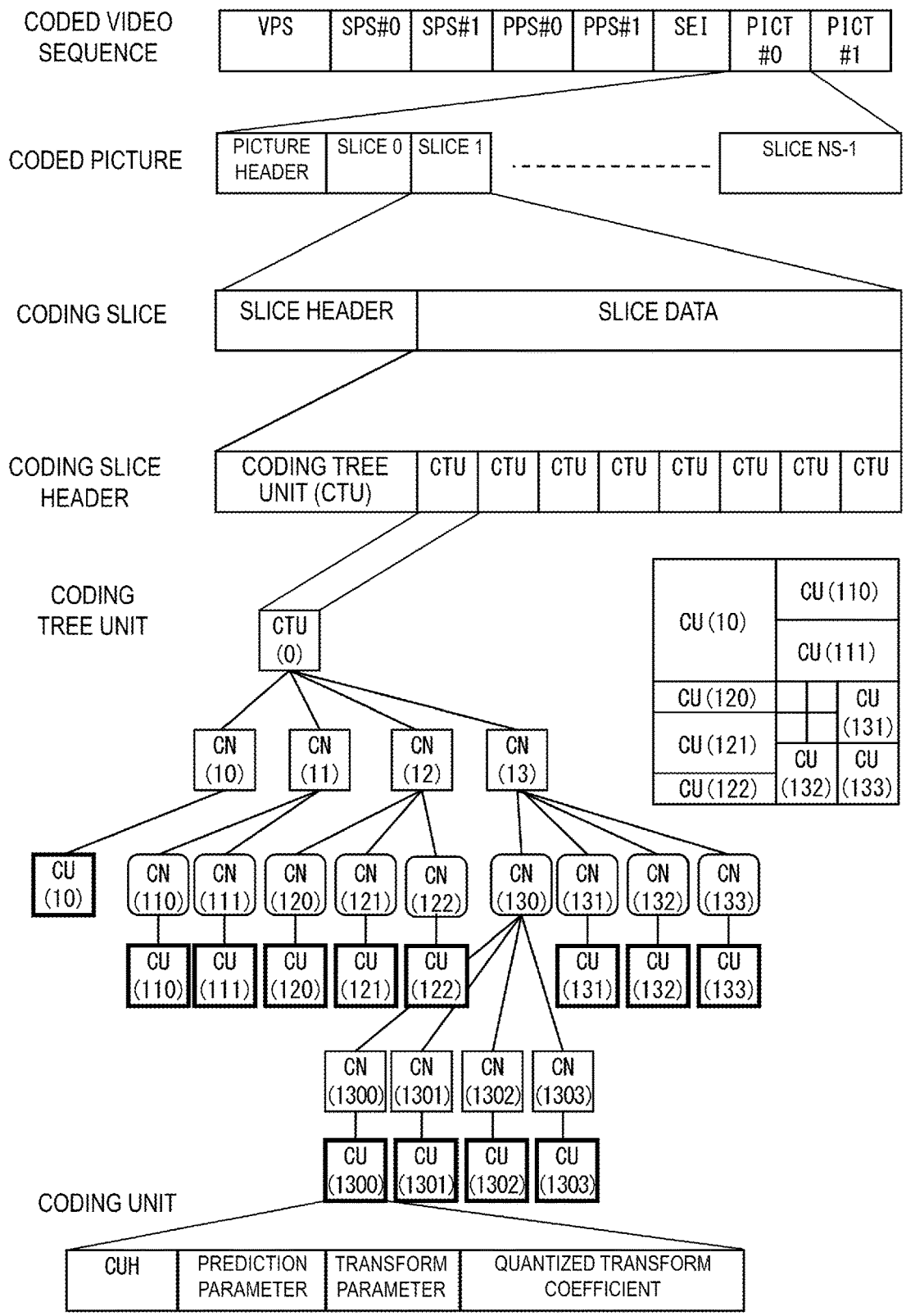
FIG. 3 is a diagram illustrating a hierarchical structure of coded data in units of PU.

FIG. 3 is a diagram illustrating a hierarchical structure of data in the coded data Te in units of PU. The coded data Te includes a sequence and multiple pictures constituting the sequence illustratively. FIG. 3 is a diagram illustrating a coded video sequence defining a sequence SEQ, a coded picture prescribing a picture PICT, a coding slice prescribing a slice S, a coding slice data prescribing slice data, a coding tree unit included in the coding slice data, and a coding unit included in the coding tree unit.

In the coded video sequence, a set of data referred to by the image decoding apparatus 31 to decode the sequence SEQ to be processed is defined. As illustrated in FIG. 3, the sequence SEQ includes a Video Parameter Set VPS, a Sequence Parameter Set SPS, a Picture Parameter Set PPS, an Adaptation Parameter Set (APS), a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the image decoding apparatus 31 to decode a target sequence is defined. For example, a width and a height of a picture are defined. Note that multiple SPSs may exist. In that case, any of the multiple SPSs is selected from the PPS.

Here, the sequence parameter set SPS includes the following syntax elements.

pic_width_max_in_luma_samples: A syntax element indicating, in units of luminance blocks, the width of one of the images in a single sequence, the image having the largest width. The syntax element has a value that is not 0 and that is an integer multiple of Max(8, MinCbSize Y). Here, MinCbSizeY is a value determined by the minimum size of the luminance block.

pic_height_max_in_luma_samples: A syntax element indicating, in units of luminance blocks, the height of one of the images in a single sequence, the image having the largest height. The syntax element has a value that is not 0 and that is an integer multiple of Max(8, MinCbSize Y).

In the picture parameter set PPS, a set of coding parameters referred to by the image decoding apparatus 31 to decode each picture in a target sequence is defined. Note that multiple PPSs may exist. In that case, any of the multiple PPSs is selected from each picture in a target sequence.

Here, the picture parameter set PPS includes the following syntax elements.

pps_pic_width_in_luma_samples: A syntax element indicating the width of a target picture. The syntax element is required to have a value that is not 0 and that is an integer multiple of Max(8, MinCbSizeY) and that is equal to or less than sps_pic_width_max_in_luma_samples. InpPic WidthInLumaSamples to be described later is set equal to pps_pic_width_in_luma_samples.

pps_pic_height_in_luma_samples: A syntax element indicating the height of the target picture. The syntax element is required to have a value that is not 0 and that is an integer multiple of Max(8, MinCbSizeY) and that is equal to or less than sps_pic_height_max_in_luma_samples. InpPicHeightInLumaSamples to be described later is set equal to pps_pic_height_in_luma_samples.

pps_conformance_window_flag: A flag indicating whether a conformance (cropping) window offset parameter is subsequently signaled, the flag indicating a location where a conformance window is displayed. In a case that the flag is 1, the parameter is signaled, and in a case that the flag is 0, then no conformance window offset parameter is present.

sps_chroma_format_id is a parameter indicating a chrominance format. ChromaFormatIdc to be described later is set equal to sps_chroma_format_id.

pps_init_qp_minus26 is information for deriving a quantization parameter SliceQpY of a slice referred to in the PPS.

Coded Picture

In the coded picture, a set of data referred to by the image decoding apparatus 31 to decode the picture PICT to be processed is defined. As illustrated in FIG. 3, the picture PICT includes a picture header PH and slices 0 to NS−1 (NS is the total number of slices included in the picture PICT).

Coding Slice

In the coding slice, a set of data referred to by the image decoding apparatus 31 to decode the slice S to be processed is defined. As illustrated in FIG. 3, the slice includes a slice header and slice data.

The slice header includes a coding parameter group referenced by the image decoding apparatus 31 to determine a decoding method for a target slice. Slice type indication information (slice_type) indicating a slice type is one example of a coding parameter included in the slice header.

Examples of slice types that can be indicated by the slice type indication information include (1) I slices for which only an intra prediction is used in coding, (2) P slices for which a uni-prediction (L0 prediction) or an intra prediction is used in coding, and (3) B slices for which a uni-prediction (L0 prediction or L1 prediction), a bi-prediction, or an intra prediction is used in coding, and the like. Note that the inter prediction is not limited to a uni-prediction and a bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referenced by the image decoding apparatus 31 to decode the slice data to be processed is defined. The slice data includes CTUs as illustrated in the coding slice header in FIG. 3. The CTU is a block of a fixed size (for example, 64×64) constituting a slice, and may also be called a Largest Coding Unit (LCU).

Coding Tree Unit

In FIG. 3, a set of data is defined that is referenced by the image decoding apparatus 31 to decode the CTU to be processed. The CTU is split into coding units CUs, each of which is a basic unit of coding processing, by a recursive Quad Tree split (QT split), Binary Tree split (BT split), or Ternary Tree split (TT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

Coding Unit

In FIG. 3, a set of data referenced by the image decoding apparatus 31 to decode the coding unit to be processed is defined. Specifically, the CU includes a CU header CUH, a prediction parameter, a transform parameter, a quantized transform coefficient, and the like. In the CU header, a prediction mode and the like are defined.

There are cases that the prediction processing is performed in units of CU or performed in units of sub-CU in which the CU is further split.

There are two types of predictions (prediction modes), which are intra prediction and inter prediction. The intra prediction refers to a prediction in an identical picture, and the inter prediction refers to prediction processing performed between different pictures (for example, between pictures of different display times, and between pictures of different layer images).

Transform and quantization processing is performed in units of CU, but the quantized transform coefficient may be subjected to entropy coding in units of subblock such as 4×4.

Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

Configuration of Image Decoding Apparatus

Figure 4:
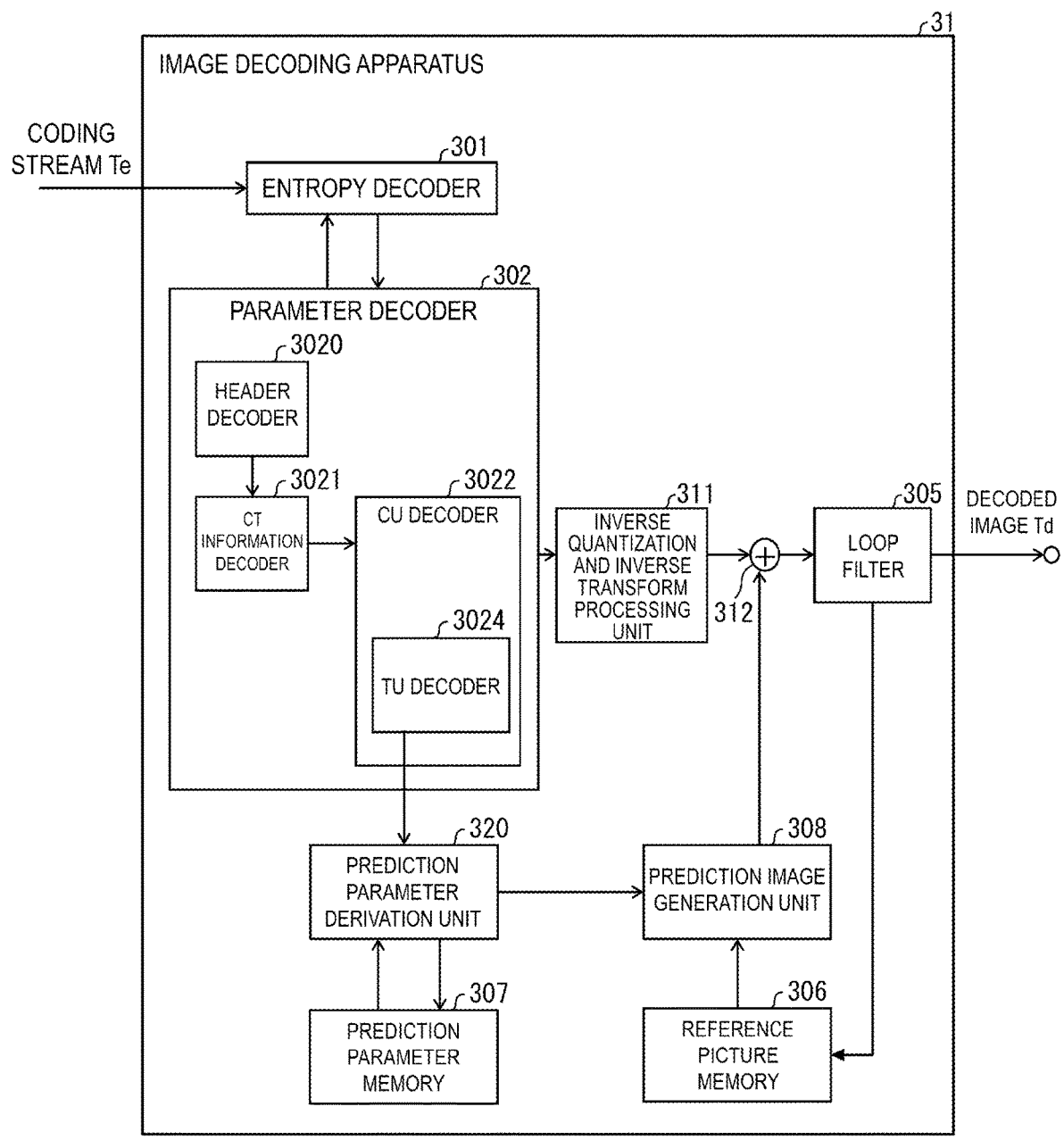
FIG. 4 is a schematic diagram illustrating a configuration of an image decoding apparatus.

The configuration of the image decoding apparatus 31 (FIG. 4) according to the present embodiment will be described.

The image decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the image decoding apparatus 31 may be used in accordance with the image coding apparatus 11 described later.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as the VPS, the SPS, the PPS, and an APS, and a slice header (slice information). The CT information decoder 3021 decodes a CT from coded data. The CU decoder 3022 decodes a CU from coded data. The TU decoder 3024 decodes QP update information (quantization correction value) and quantization prediction error (residual_coding) from coded data.

The prediction image generation unit 308 includes an inter prediction image generation unit 309 and an intra prediction image generation unit 310.

The entropy decoder 301 performs entropy decoding on the coded data Te input from the outside and separates and decodes individual codes (syntax elements).

The entropy decoder 301 outputs the decoded codes to the parameter decoder 302. Which code is to be decoded is controlled based on an indication of the parameter decoder 302.

Basic Flow

Figure 5:
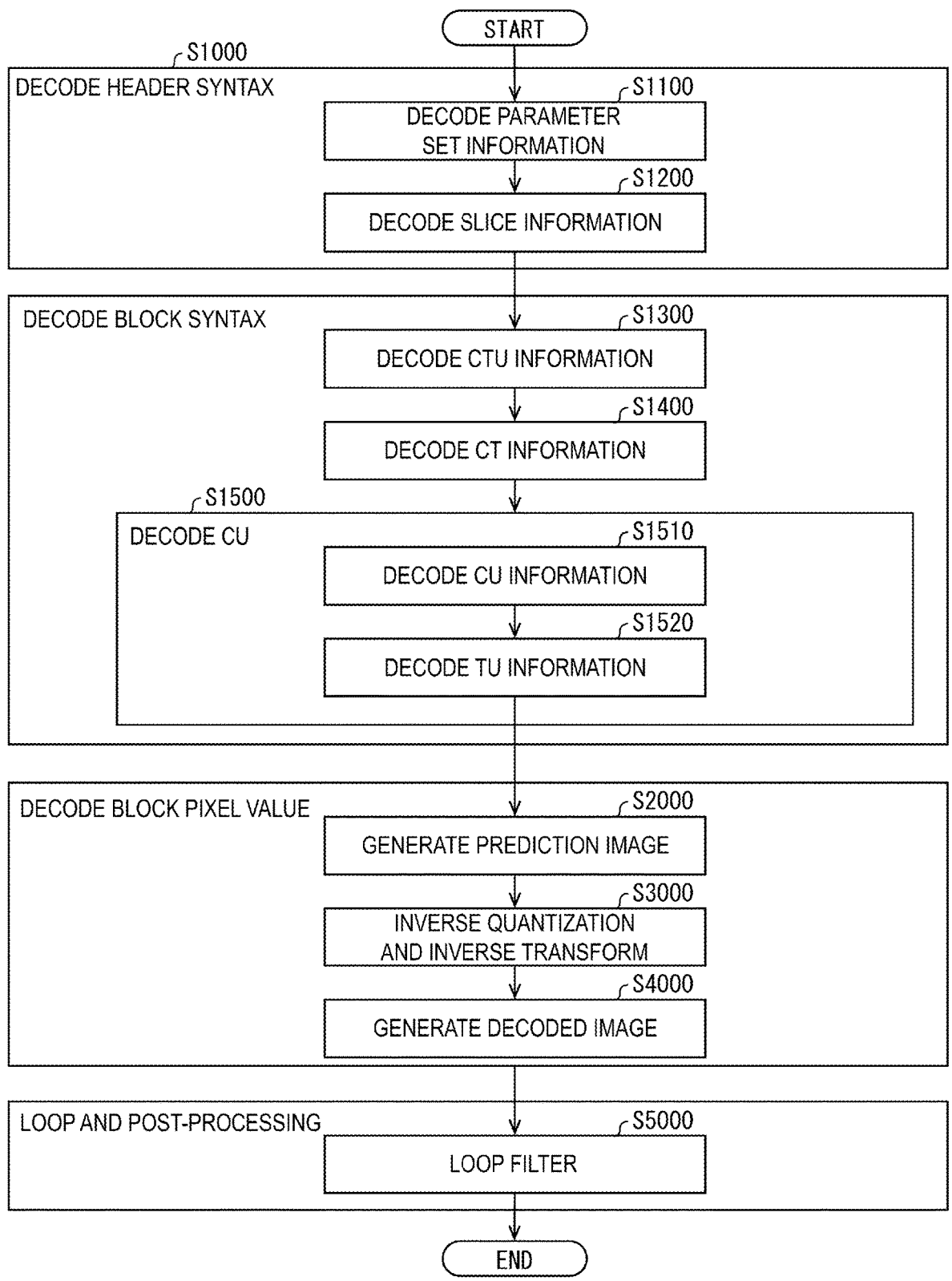
FIG. 5 is a flowchart illustrating general operation of the image decoding apparatus.

FIG. 5 is a flowchart illustrating general operation of the image decoding apparatus 31.

(S1100: Decoding of parameter set information) The header decoder 3020 decodes parameter set information such as the VPS, the SPS, and the PPS from coded data.

(S1200: Decoding of slice information) The header decoder 3020 decodes a slice header (slice information) from the coded data.

Afterwards, the image decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes CU information, prediction information, and the like from the coded data.

(S1520: Decoding of TU information) The TU decoder 3024 decodes QP update information, a quantization prediction error, and the like from the coded data. Note that the QP update information is a difference value from a quantization parameter prediction value qPpred, which is a prediction value of a quantization parameter QP.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

In NPL 1, the following problem is present: in a case that an integer value is used in a format of an input value of an input tensor of post-filter processing, a value of a strength control value StrengthControlVal input to the input tensor is defined only as a real number value between 0 and 1 obtained from decoded information, and processing with an unsigned integer cannot be performed.

In NPL 2, in a case that an integer value is used in a format of an input value of an input tensor of post-filter processing, bit-depths are independently defined for luminance and chrominance. However, similarly to NPL 1, the following problem is present: StrengthControlVal remains a real number value, and there is no method of applying the value of StrengthControlVal to accuracy of input tensors different between luminance and chrominance.

In the present embodiment, the problem in that there is no method of defining the strength control value to be input in the post-filter processing can be solved.

Neural Network Post-Filter Characteristics (NNPFC) SEI

FIG. 7 illustrates an outline of syntax of a neural network post-filter characteristics (NNPFC) SEI message of NPL 2. The supplemental enhancement information decoding apparatus 91 decodes syntax elements (for example, nnpfc_auxiliary_inp_idc, nnpfc_inp_order_idc, nnpfc_inp_format_idc, and the like) illustrated in FIG. 7. The NNPFC SEI message indicates the neural network to be applied as the post-filter processing. Application of specific post-filter processing for a specific picture is indicated by a neural network post-filter activation SEI message (FIG. 8).

To apply the SEI message, the following variables need to be defined.

width InpPic WidthInLumaSamples and height InpPicHeightInLumaSamples of each luminance pixel of a picture decoded by the image decoding apparatus 31 a luminance pixel array CroppedYPic[idx], a chrominance pixel array CroppedCbPic[idx], and CroppedCrPic[idx], and a picture having idx of a range from 0 to numInputPics−1 used as an input of post-filter processing pixel bit-depth BitDepthY of the luminance pixel array pixel bit-depth BitDepthC of the chrominance pixel array variables SubWidthC and SubHeightC indicating a chrominance format indicated by a chrominance format ChromaFormatIdc of the picture. In a case of 4:2:0, the variables SubWidthC and SubHeightC are both 2, in a case of 4:2:2, the variable SubWidthC is 2 and the variable SubHeightC is 1, and in a case of 4:4:4, the variables SubWidthC and SubHeightC are both 1.

nnpfc_auxiliary_inp_idc indicates that supplemental input data is present in the input tensor of the neural network post-filter. In a case that the value is equal to 1, the strength control value StrengthControlVal (strength control information) being a real number in a range from 0 to 1 is input as the supplemental input data. Note that the real number may be a decimal number or a floating-point number. The strength control value may be, as with a quantization parameter, a value obtained in a process of generating a decoded image.

nnpfc_id indicates an identification number that can be used for identifying the post-filter processing.

In a case that the NNPFC SEI message is a first NNPFC SEI message in decoding order having a specific nnpfc_id value in the current CLVS, the following is applied.

The SEI message indicates that it is basic post-filter processing.

The SEI message relates to the current decoded picture and all of subsequent decoded pictures in the current layer until the end of the current CLVS. In a case that the NNPFC SEI message is the current CLVS and a repetition of a previous NNPFC SEI message in decoding order, for subsequent semantics, the SEI message is applied supposedly as the only NNPFC SEI message having the same contents in the current CLVS.

In a case that the NNPFC SEI message is not the first NNPFC SEI message in decoding order having the specific nnpfc_id value in the current CLVS, the following is applied.

The SEI message indicates that it is update related to a previous basic post-filter in decoding order using the same nnpfc_id value.

The SEI message relates to the current decoded picture and all of subsequent decoded pictures in the current layer until the end of the current CLVS or until the next NNPFC SEI message having the specific nnpfc_id value in the current layer.

In a case that nnpfc_mode_idc is 0, it indicates whether the SEI message includes an ISO/IEC 15938-17 bitstream indicating the post-filter processing, or that the SEI message is update related to a basic post-processing filter having the same nnpfc_id value.

In a case that nnpfc_mode_idc is 1, it indicates that the post-filter processing associated with the nnpfc_id value is the neural network identified with a URI indicated by nnpfc_uri.

nnpfc_reserved_zero_bit_a indicates 0.

nnpfc_tag_uri includes a tag URI having syntax and semantics indicated by IETF RFC 4151. It is used for a format and related information related to the neural network used as the basic post-filter processing or update related to the post-filter processing in which the same nnpfc_id value is indicated. Note that nnpfc_tag_uri enables unique identification of a format of neural network data indicated by nnpfc_uri, without the need of a registration entity. In a case that nnpfc_tag_uri is "tag:iso.org,2023:15938-17", it indicates that data of the neural network identified by nnpfc_uri conforms to ISO/IEC 15938-17 and is encoded with Neural Network Coding (NNC).

nnpfc_uri includes a URI having syntax and semantics indicated by IETF Internet Standard 66, and is used as the neural network used as the post-filter processing or update related to the post-filter processing having the same nnpfc_id value.

In a case that nnpfc_formatting_and_purpose_flag is 1, it indicates that a syntax element related to the purpose of the filter, the input format, the output format, and complexity is present. In a case that nnpfc_formatting_and_purpose_flag is 0, the syntax element related to the purpose of the filter, the input format, the output format, and complexity is not present.

In a case that the SEI message is the first NNPFC SEI message in decoding order having the specific nnpfc_id value in the current CLVS, nnpfc_formatting_and_purpose_flag is equal to 1. In a case that the SEI message is not the first NNPFC SEI message in decoding order, or the specific nnpfc_id value is present in the current CLVS, the value of nnpfc_formatting_and_purpose_flag needs to be 0.

nnpfc_purpose indicates the purpose of the post-filter processing. In a case that the value of nnpfc_purpose is 1, it indicates image quality improvement. In a case that it is 2, it indicates upsampling from a 4:2:0 chrominance format to 4:2:2 or 4:4:4 chrominance, or upsampling from a 4:2:2 chrominance format to 4:4:4 chrominance. In a case that it is 3, it indicates increase of the width or the height of a trimmed decoded output image without changing the chrominance format. In a case that it is 4, it indicates increase of the width or the height of a decoded output image, and upsampling of the chrominance format. In a case that it is 5, it indicates a picture rage upsampling.

nnpfc_inp_order_idc is a format of the input tensor, and indicates a method of ordering the pixel array of the decoded image as an input to the post-filter processing. Semantics of nnpfc_inp_order_idc in a range of 0 to 3 indicates a process of deriving an input tensor inputTensor for each value of nnpfc_inp_order_idc. From vertical pixel coordinates c Top and horizontal pixel coordinates cLeft, a top left pixel position of a patch of pixels included in the input tensor is indicated. inpPatchHeight and inpPatch Width indicate the height and the width of the patch. In a case that the chrominance format of the decoded image is not 4:2:0, the value of nnpfc_inp_order_idc cannot be set equal to 3. overlapSize is the number of pixels overlapped by the patch.

In a case that the value of nnpfc_inp_order_idc is 0, only a luminance matrix is present in the input tensor, and thus the number of channels is 1. A process DeriveInputTensors( ) for deriving the input tensor is as follows.

```
for(yP=-overlapSize;yP<inpPatchHeight+overlapSize;yP++)
  for(xP=-overlapSize;xP<inpPatchWidth+overlapSize;xP++){
    inpVal=InpY(InpSampleVal(cTop+yP,cLeft+xP,InpPicHeightIn-
LumaSamples,
        InpPicWidthInLumaSamples, CroppedYPic))
    if(nnpfc_component_last_flag==0)
      inputTensor[0][0][yP+overlapSize][xP+overlapSize]=inpVal
    else
      inputTensor[0][yP+overlapSize][xP+overlapSize][0]=inpVal
  }
  if(nnpfc_auxiliary_inp_idc == 1) {
    if( !nnpfc_component_last_flag )
      inputTensor[0][2][yP+overlapSize][xP+overlapSize]=StrengthCon-
trolVal
    else
        inputTensor[0][yP+overlapSize][xP+overlapSize][2]=StrengthCon-
trolVal
  }
```

Here, StrengthControlVal may be a variable StrengthControlValY derived from luminance as described below.

```
if(nnpfc_auxiliary_inp_idc == 1) (
  if( !nnpfc_component_last_flag )
    inputTensor[0][1][yP+overlapSize][xP+overlapSize]=StrengthCon-
trolValY
  else
    inputTensor[0][yP+overlapSize][xP+overlapSize][1]=StrengthCon-
trolValY
}
```

In a case that the value of nnpfc_inp_order_idc is 1, only the chrominance matrix is present in the input tensor, and thus the number of channels is 2. The process DeriveInputTensors( ) for deriving the input tensor is as follows.

```
for(yP=-overlapSize;yP<inpPatchHeight+overlapSize;yP++)
  for(xP=-overlapSize;xP<inpPatchWidth+overlapSize;xP++){
    inpCbVal=InpC(InpSampleVal(cTop+yP,cLeft+xP,
        InpPicHeightInLumaSamples/SubHeightC,
        InpPicWidthInLumaSamples/SubWidthC,CroppedCbPic))
    inpCrVal=InpC(InpSampleVal(cTop+yP,cLeft+xP,
        InpPicHeightInLumaSamples/SubHeightC,
        InpPicWidthInLumaSamples/SubWidthC,CroppedCrPic))
    if(nnpfc_component_last_flag==0){
      inputTensor[0][0][yP+overlapSize][xP+overlapSize]=inpCbVal
      inputTensor[0][1][yP+overlapSize][xP+overlapSize]=inpCrVal
    }else{
      inputTensor[0][yP+overlapSize][xP+overlapSize][0]=inpCbVal
      inputTensor[0][yP+overlapSize][xP+overlapSize][1]=inpCrVal
    }
  }
  if(nnpfc_auxiliary_inp_idc == 1) {
    if( !nnpfc_component_last_flag )
      inputTensor[0][2][yP+overlapSize][xP+overlapSize]=StrengthCon-
trolVal
    else
      inputTensor[0][yP+overlapSize][xP+overlapSize][2]=StrengthCon-
trolVal
  }
```

In NPL 1 and NPL 2, the strength control value StrengthControlVal is not distinguished between luminance and chrominance; however, in general, property of an image signal is different between luminance and chrominance.

In view of this, in the present embodiment, a method of separately using the strength control values for luminance and chrominance is described. Specifically, StrengthControlVal may be a variable StrengthControlValC derived from chrominance as described below.

```
if(nnpfc_auxiliary_inp_idc == 1) {
  if( !nnpfc_component_last_flag )
    inputTensor[0][2][yP+overlapSize][xP+overlapSize]=StrengthCon-
trolValC
  else
    inputTensor[0][yP+overlapSize][xP+overlapSize][2]=StrengthCon-
trolValC
}
```

In a case that the value of nnpfc_inp_order_ide is 2, both of the luminance matrix and the chrominance matrix are present in the input tensor, and thus the number of channels is 3. The process DeriveInputTensors( ) for deriving the input tensor is as follows.

```
for(yP=-overlapSize;yP<inpPatchHeight+overlapSize;yP++)
  for(xP=-overlapSize;xP<inpPatchWidth+overlapSize;xP++){
    yY=cTop+yP
    xY=cLeft+xP
    yC=yY/SubHeightC
    xC=xY/SubWidthC
    inpYVal=InpY(InpSampleVal(yY,xY,InpPicHeightInLumaSamples,
        InpPicWidthInLumaSamples,CroppedYPic))
    inpCbVal=InpC(InpSampleVal(yC,xC,InpPicHeightInLumaSamples/
SubHeightC,
        InpPicWidthInLumaSamples/SubWidthC,CroppedCbPic))
    inpCrVal=InpC(InpSampleVal(yC,xC,InpPicHeightInLumaSamples/
SubHeightC,
        InpPicWidthInLumaSamples/SubWidthC,CroppedCrPic))
    if(nnpfc_component_last_flag==0){
      inputTensor[0][0][yP+overlapSize][xP+overlapSize]=inpYVal
      inputTensor[0][1][yP+overlapSize][xP+overlapSize]=inpCbVal
      inputTensor[0][2][yP+overlapSize][xP+overlapSize]=inpCrVal
    } else {
      inputTensor[0][yP+overlapSize][xP+overlapSize][0]=inpYVal
      inputTensor[0][yP+overlapSize][xP+overlapSize][1]=inpCbVal
      inputTensor[0][yP+overlapSize][xP+overlapSize][2]=inpCrVal
    }
  }
}
```

```
if(nnpfc_auxiliary_inp_idc == 1) {
  if( !nnpfc_component_last_flag )
    inputTensor[0][3][yP+overlapSize][xP+overlapSize]=StrengthControlVal
  else
    inputTensor[0][yP+overlapSize][xP+overlapSize][3]=StrengthControlVal
}
```

Here, StrengthControlVal may be the variable StrengthControlValY derived from luminance as described below.

```
if(nnpfc_auxiliary_inp_idc == 1) {
  if( !nnpfc_component_last_flag )
    inputTensor[0][3][yP+overlapSize][xP+overlapSize]=StrengthControlValY
  else
    inputTensor[0][yP+overlapSize][xP+overlapSize][3]=StrengthControlValY
}
```

Note that multiple values may be further input in accordance with nnpfc_auxiliary_inp_idc. In a case that nnpfc_auxiliary_inp_idc is a value (==2) indicating input of both of luminance and chrominance, values StrengthControlValY and StrengthControlValC different between luminance and chrominance may be input (independent parameter configuration).

```
if(nnpfc_auxiliary_inp_idc == 2) {
  if( !nnpfc_component_last_flag )
    inputTensor[0][3][yP+overlapSize][xP+overlapSize]=StrengthControlValY
    inputTensor[0][4][yP+overlapSize][xP+overlapSize]=StrengthControlValC
  else
    inputTensor[0][yP+overlapSize][xP+overlapSize][3]=StrengthControlValY
    inputTensor[0][yP+overlapSize][xP+overlapSize][4]=StrengthControlValC
}
```

In a case that the value of nnpfc_inp_order_idc is 3, four luminance matrices, two chrominance matrices, and a quantization parameter matrix are present in the input tensor, and thus the number of channels is 7. A luminance channel is derived using an interleaving method. nnpfc_inp_order_idc can be used only in a case that the chrominance format is 4:2:0. The process DeriveInputTensors( ) for deriving the input tensor is as follows.

```
for(yP=-overlapSize;yP<inpPatchHeight+overlapSize;yP++)
  for(xP=-overlapSize;xP<inpPatchHeight+overlapSize;xP++){
    yTL=cTop+yP*2
    xTL=cLeft+xP*2
    yBR=yTL+1
    xBR=xTL+1
    yC=cTop/2+yP
    xC=cLeft/2+xP
    inpTLVal=InpY(InpSampleVal(yTL,xTL,InpPicHeightInLumaSamples,
      InpPicWidthInLumaSamples,CroppedYPic))
    inpTRVal=InpY(InpSampleVal(yTL,xBR,InpPicHeightInLumaSamples,
      InpPicWidthInLumaSamples,CroppedYPic))
    inpBLVal=InpY(InpSampleVal(yBR,xTL,InpPicHeightInLumaSamples,
      InpPicWidthInLumaSamples,CroppedYPic))
    inpBRVal=InpY(InpSampleVal(yBR,xBR,InpPicHeightInLumaSamples,
      InpPicWidthInLumaSamples,CroppedYPic))
    inpCbVal=InpC(InpSampleVal(yC,xC,InpPicHeightInLumaSamples/2,
      InpPicWidthInLumaSamples/2,CroppedCbPic))
    inpCrVal=InpC(InpSampleVal(yC,xC,InpPicHeightInLumaSamples/2,
      InpPicWidthInLumaSamples/2,CroppedCrPic))
    if(nnpfc_component_last_flag==0){
      inputTensor[0][0][yP+overlapSize][xP+overlapSize]=inpTLVal
      inputTensor[0][1][yP+overlapSize][xP+overlapSize]=inpTRVal
      inputTensor[0][2][yP+overlapSize][xP+overlapSize]=inpBLVal
      inputTensor[0][3][yP+overlapSize][xP+overlapSize]=inpBRVal
      inputTensor[0][4][yP+overlapSize][xP+overlapSize]=inpCbVal
      inputTensor[0][5][yP+overlapSize][xP+overlapSize]=inpCrVal
    }else{
      inputTensor[0][yP+overlapSize][xP+overlapSize][0]=inpTLVal
      inputTensor[0][yP+overlapSize][xP+overlapSize][1]=inpTRVal
      inputTensor[0][yP+overlapSize][xP+overlapSize][2]=inpBLVal
      inputTensor[0][yP+overlapSize][xP+overlapSize][3]=inpBRVal
      inputTensor[0][yP+overlapSize][xP+overlapSize][4]=inpCbVal
      inputTensor[0][yP+overlapSize][xP+overlapSize][5]=inpCrVal
    }
  }
if(nnpfc_auxiliary_inp_idc == 1) {
  if( !nnpfc_component_last_flag )
    inputTensor[0][6][yP+overlapSize][xP+overlapSize]=StrengthControlVal
  else
    inputTensor[0][yP+overlapSize][xP+overlapSize][6]=StrengthControlVal
}
```

Here, StrengthControlVal may be the variable StrengthControlValY derived from luminance as described below.

```
if(nnpfc_auxiliary_inp_idc == 1) {
  if( !nnpfc_component_last_flag )
    inputTensor[0][6][yP+overlapSize][xP+overlapSize]=StrengthControlValY
  else
    inputTensor[0][yP+overlapSize][xP+overlapSize][6]=StrengthControlValY
}
```

Note that multiple values may be further input in accordance with nnpfc_auxiliary_inp_idc. In a case that nnpfc_auxiliary_inp_idc is a value (==3) indicating input of both of luminance and chrominance, values StrengthControlValY and StrengthControlValC different between luminance and chrominance may be input (independent parameter configuration).

```
if(nnpfc_auxiliary_inp_idc == 2) {
  if( !nnpfc_component_last_flag )
    inputTensor[0][6][yP+overlapSize][xP+overlapSize]=StrengthControlValY
    inputTensor[0][7][yP+overlapSize][xP+overlapSize]=StrengthControlValC
  else
    inputTensor[0][yP+overlapSize][xP+overlapSize][6]=StrengthControlValY
    inputTensor[0][yP+overlapSize][xP+overlapSize][7]=StrengthControlValC
}
``` nnpfc_inp_format_idc indicates a type of an input value (accuracy of an input value) of the input tensor of the neural network of the post-filter processing. In a case that nnpfc_inp_format_idc is 0, it indicates that the input value is a real number, and in a case that nnpfc_inp_format_idc is 1, it indicates that the input value is an unsigned integer.

In a case that the value of nnpfc_inp_format_idc is 0, functions InpY and InpC are derived as follows.

$$InpY(x) = x \div ((1 << BitDepthY) - 1)$$

$$InpC(x) = x \div ((1 << BitDepthC) - 1)$$

In a case that the value of nnpfc_inp_format_idc is 1, the functions InpY and InpC are derived as follows.

```
shift=BitDepthY−inpTensorBitDepthY
if(inpTensorBitDepthY>=BitDepthY)
    InpY(x)=x<<(inpTensorBitDepthY−BitDepthY)
else
    InpY(x)=Clip3(0, (1<<inpTensorBitDepthY)−1,
(x+(1<<(shift−1)))>>shift)
    shift=BitDepthC−inpTensorBitDepthY
    if(inpTensorBitDepthC>=BitDepthC)
        InpC(x)=x<<(inpTensorBitDepthC−BitDepthC)
    else
        InpC(x)=Clip3(0, (1<<inpTensorBitDepthC)−1,
(x+(1<<(shift−1)))>>shift)
```

In a case that nnpfc_inp_format_idc is 1, in NPL 2, nnpfc_inp_tensor_luma_bitdepth_minus8 and nnpfc_inp_tensor_chroma_bitdepth_minus8 are coded and decoded. Values obtained by adding 8 to nnpfc_inp_tensor_luma_bitdepth_minus8 and nnpfc_inp_tensor_chroma_bitdepth_minus8 are bit-depth inpTensorBitDepthY of a pixel value for luminance and bit-depth inpTensorBitDepthC of a pixel value for chrominance, respectively, in a case that the pixel values input to the neural network of the post-filter processing are unsigned integers. The following expression is used for derivation.

```
inpTensorBitDepthY = nnpfc_inp_tensor_luma_bitdepth_minus8 + 8
inpTensorBitDepthC = nnpfc_inp_tensor_chroma_bitdepth_minus8 + 8
```

StrengthControlVal is a real number value between 0 and 1, and is a value derived from a syntax value (for example, a quantization parameter) for controlling image quality of coded data, such as HEVC and VVC, and may use a value decoded by the image decoding apparatus 31. In a case that an integer is indicated for the format of the input value of the input tensor (in a case that nnpfc_inp_format_idc is 0), StrengthControlVal decoded from coded data is directly used.

NPL 1 and NPL 2 have a problem in that, in a case that an integer is indicated for the format of the input value of the input tensor (in a case that nnpfc_inp_format_idc is 1), StrengthControlVal of the integer value is not defined.

In view of this, in a case that an integer is indicated for the format of the input value of the input tensor (in a case that nnpfc_inp_format_idc is 1), StrengthControlVal may be derived as follows, using the bit-depth for luminance.

*StrengthControlVal =* floor(*StrengthControlVal* ∗ ((1<< *inpTensorBitDepthY*) − 1))

Note that, in the above expression, the same variable name is used before and after update, but different variable names may be used.

By performing such derivation, even in a case that nnpfc_inp_format_idc is 1, the post-filter processing can be implemented using the neural network with the strength control value being an unsigned integer value.

As another solution, using a strength value StrengthControlValInDecoder obtained from the image decoding apparatus 31, transform may be performed as follows.

```
if (nnpfc_inp_format_idc == 0)
    StrengthControlVal= StrengthControlValInDecoder
else if (nnpfc_inp_format_idc == 1)
    StrengthControlVal
        =floor(StrengthControlValInDecoder*((1 <<
inpTensorBitDepthY)−1)
```

Note that, in the image decoding apparatus 31, StrengthControlVal (StrengthControlValInDecoder) may be set with the value of the quantization parameter obtained from coded data being normalized to a real number between 0 and 1. For example, derivation may be performed as follows.

StrengthControl*Val*=Slice*QpY* of first slice of target picture÷*NormQP*

Furthermore, clip processing may be explicitly performed so that the range of the value is 0 . . . 1.

StrengthControl*Val*=Clip3(0.0,1.0,Slice*QpY* of first slice of target picture÷*NormQP*)

This is the same in the following expression.

StrengthControl*Val*=Clip3(0,1,Slice*QpY* of first slice of target picture÷*NormQP*)

Note that SliceQpY is a value of the quantization parameter in the first slice decoded from coded data, and is set equal to 0 in a case of being a negative value. NormQP is a value for normalization, and is a maximum value of the quantization parameter or the maximum value+1. For example, in a case of H.266/VVC, the maximum value of the quantization parameter is 63, and thus the value of NormQP is 63 or 64. In a case of H.264/AVC and H.265/HEVC, the maximum value of the quantization parameter is 51, and thus the value of NormQP may be 51 or 52.

As another embodiment, on the assumption that the maximum value is pixel bit-depth for luminance and StrengthControlValInDecoder=SliceQpY, derivation may be performed as follows, using the function InpY00.

StrengthControl*Val*=*InpY*(StrengthControl*Val*InDecoder)

nnpfc_reserved_zero_bit_b is set equal to 0, and nnpfc_payload_byte[i] conforms to ISO/IEC 15938-17 and is an i-th byte of the bitstream coded with NNC.

In NPL 2, the bit-depth inpTensorBitDepthY of the pixel value for luminance and the bit-depth inpTensorBitDepthC of the pixel value for chrominance in a case that the pixel values input to the neural network of the post-filter processing are unsigned integers are independently defined. Thus, there is a problem in that definition of StrengthControlVal of the integer value is unclear.

In view of this, the supplemental enhancement information decoding apparatus 91 may change whether the bit-depth for luminance is used or the bit-depth for chrominance is used for derivation of StrengthControlVal, in accordance with the format nnpfc_inp_order_idc of the input tensor. Specifically, in a case that luminance is input to the input tensor and chrominance is not input thereto (for example, nnpfc_inp_order_idc==0), the bit-depth for luminance may be used, and in a case that chrominance is input to the input tensor and luminance is not input thereto (for example, nnpfc_inp_order_idc==1), the bit-depth for chrominance may be used. Specifically, derivation may be performed using the following expression.

```
if (nnpfc_inp_format_idc==1) {
    if (nnpfc_inp_order_idc == 0)
        StrengthControlVal=floor(StrengthControlVal*((1 <<
inpTensorBitDepthY)-1))
    )
        else if (nnpfc_inp_order_idc == 1)
            StrengthControlVal=floor(StrengthControlVal*((1 <<
inpTensorBitDepthC)-1)
    )
}
```

Furthermore, in a case that both of luminance and chrominance are input (nnpfc_inp_order_idc==2∣ nnpfc_inp_order_idc==3), derivation may be performed using the bit-depth for luminance (luminance-prioritized configuration).

```
if (nnpfc_inp_format_idc==1) {
    if (nnpfc_inp_order_idc == 0 || nnpfc_inp_order_idc == 2 ||
nnpfc_inp_order_idc == 3)
        StrengthControlVal=floor(StrengthControlVal*((1 <<
inpTensorBitDepthY)-1)
    )
        otherwise (nnpfc_inp_order_idc == 1)
            StrengthControlVal=floor(StrengthControlVal*((1 <<
inpTensorBitDepthC)-1)
    )
}
```

As described above, in a case that information nnfc_inp_format_idc indicating the input format indicating whether it is an integer or a real number, the luminance bit-depth, and the chrominance bit-depth are decoded from coded data, and the information indicates an integer, using the luminance bit-depth and the chrominance bit-depth, the strength control value may be transformed, and the post-filter processing may be performed.

Independent Parameter Configuration

As another configuration, individual StrengthControlValY and StrengthControlValC for each luminance and chrominance may be derived by the image decoding apparatus 31, and may be input to the input tensor in accordance with the value of nnpfc_inp_order_idc.

For example, in the image decoding apparatus 31, as in the values below, the values of the quantization parameter SliceQpY for luminance and the quantization parameter SliceQpC for chrominance obtained from coded data may be normalized to real numbers between 0 and 1 and then set.

StrengthControl*ValY*=Slice*QpY* of first slice of target
picture÷*NormQP*

StrengthControl*ValC*=Min(Slice*QpC* of first slice of
target picture÷*NormQP*,1.0)

Furthermore, specifically, derivation may be performed from bit-depths inpTensorBitDepth Y and inpTensorBit-DepthC separately for luminance and chrominance.

```
if (nnpfc_inp_format_idc==1) {
    StrengthControlValY=floor(StrengthControlValY*((1 <<
inpTensorBitDepthY)-1)
    StrengthControlValC=floor(StrengthControlValC*((1 <<
inpTensorBitDepthC)-1)
}
```

Decimal and Integer Parameter Configuration

As another configuration, the strength control values StrengthControlValFloat and StrengthControlValInt of an integer and a real number may be derived, and may be input to the input tensor in accordance with the value of nnpfc_inp_format_idc.

For example, in the image decoding apparatus 31, as in the values below, the values of the quantization parameter SliceQpY for luminance and the quantization parameter SliceQpC for chrominance obtained from coded data may be normalized to real numbers between 0 and 1 and then set.

StrengthControl*Val*Float=Slice*QpY* of first slice of
target picture÷*NormQP*

StrengthControl*Val*Int=Slice*QpY* of first slice of target
picture

For example, setting may be performed as follows.

```
if(nnpfc_auxiliary_inp_idc == 1) {
    if( !nnpfc_component_last_flag )
        inputTensor[0][1](yP+overlapSize)[xP+overlapSize]=
nnpfc_inp_format_idc ==0 ? StrengthControlValFloat : StrengthControlValInt
    else
        inputTensor[0][yP+overlapSize][xP+overlapSize][1]=StrengthControlValY
```

Neural Network Post-Filter Activation (NNPFA) SEI

FIG. 8 illustrates syntax of the neural network post-filter activation (NNPFA) SEI message. The neural network post-filter activation NNPFA SEI message activates or deactivates application of target neural network post-filter processing identified by nnpfa_target_id for the post-filter processing of a series of pictures.

nnpfa_target_id indicates the neural network post-filter processing of a target picture. This identifies one or more NNPFC SEI messages having nnpfc_id equal to nnpfa_target_id for the current picture.

Unless one or both of the following conditions are true, the NNPFA SEI message having a specific value of nnpfa_target_id must not be present in the current PU.

In the current CLVS, there is an NNPFC SEI message having nnpfc_id equal to the specific value of nnpfa_target_id present in the PU prior to the current PU in decoding order.

There is an NNPFC SEI message having nnpfc_id equal to the specific value of nnpfa_target_id of the current PU.

In a case that both of the NNPFC SEI message having a specific value of nnpfc_id in the PU and the NNPFA SEI message having nnpfa_target_id equal to the specific value of nnpfc_id are included, the NNPFC SEI message is prior to the NNPFA SEI message in decoding order.

In a case that nnpfa_cancel_flag is 1, continuity of the target neural network post-filter processing set by a previous NNPFA SEI message having the same nnpfa_target_id as the current SEI message is to be cancelled. In other words, the target neural network post-filter processing is not performed.

A case that the same nnpfa_target_id and nnpfa_cancel_flag as the current SEI message are 0 leads to no use unless being activated by another NNPFA SEI message. In a case that nnpfa_cancel_flag is 0, it indicates that nnpfa_persistence_flag continues.

nnpfa_persistence_flag indicates that the target neural network post-filter processing of the current layer continues in display output order.

In a case that nnpfa_persistence_flag is 0, it indicates that the target neural network post-filter processing is applied to the post-filter processing of only the current picture.

In a case that nnpfa_persistence_flag is 1, it indicates that the target neural network post-filter processing is applied to the post-filter processing of the current image and all of the subsequent pictures of the current layer, until one or more of the following conditions become true.

A new CLVS of the current layer starts

The bitstream ends

The image of the current layer associated with the NNPFA SEI message having the same nnpfa_target_id as the current SEI message and nnpfa_cancel_flag equal to 1 is output after the current image in display output order.

Note that, in a case that the same nnpfa_target_id and nnpfa_cancel_flag as the current SEI message are 1, the neural network post-filter processing is not applied to subsequent pictures of the current layer associated with the NNPFA SEI message.

The supplemental enhancement information generating apparatus 71, the supplemental enhancement information coding apparatus 81, and the supplemental enhancement information decoding apparatus 91 may store a general-purpose network parameter in common. The supplemental enhancement information generating apparatus 71 generates a network parameter for partially updating the general-purpose network stored in common as the supplemental enhancement information, using a framework such as the neural network post-filter characteristics SEI. Then, the supplemental enhancement information coding apparatus 81 may perform coding, and the supplemental enhancement information decoding apparatus 91 may perform decoding. With such a configuration, the amount of codes of the supplemental enhancement information can be reduced, and the supplemental enhancement information in accordance with the input image T can be generated, coded, and decoded.

As a transmission format of the network parameter, a parameter (identifier) indicating a format may be transmitted in order to support multiple formats. Actual supplemental enhancement information following the identifier may be transmitted in a byte string.

The supplemental enhancement information of the network parameter decoded in the supplemental enhancement information decoding apparatus 91 is input to the post-filter processing apparatus 61.

Using the decoded supplemental enhancement information (neural network post-filter characteristics SEI, neural network post-filter activation SEI), the post-filter processing apparatus 61 performs post-image processing using the neural network, and restores a decoded video Td.

The supplemental enhancement information coding apparatus 81 encodes the supplemental enhancement information, based on the syntax tables of FIG. 7 and FIG. 8. The supplemental enhancement information is encoded as the supplemental enhancement information SEI, multiplexed on the coded data Te output by the image coding apparatus 11, and output to the network 21.

The supplemental enhancement information decoding apparatus 91 decodes the supplemental enhancement information from the coded data Te, based on the syntax tables of FIG. 7 and FIG. 8, and transmits decoded results to the post-filter processing apparatus 61 and the image display apparatus 41. The supplemental enhancement information decoding apparatus 91 decodes the supplemental enhancement information encoded as the supplemental enhancement information SEI.

The post-filter processing apparatus 61 performs the post-image processing on the decoded video Td, using the decoded video Td and the supplemental enhancement information, and generates post-image processing To.

The supplemental enhancement information generating apparatus 71, the supplemental enhancement information coding apparatus 81, and the supplemental enhancement information decoding apparatus 91 may store a general-purpose network parameter in common. The supplemental enhancement information generating apparatus 71 may generate a network parameter for partially updating the general-purpose network stored in common as the supplemental enhancement information, the supplemental enhancement information coding apparatus 81 may perform coding, and the supplemental enhancement information decoding apparatus 91 may perform decoding. With such a configuration, the amount of codes of the supplemental enhancement information can be reduced, and the supplemental enhancement information in accordance with the input image T can be generated, coded, and decoded.

As a transmission format of the network parameter, a parameter (identifier) indicating a format may be transmitted in order to support multiple formats. Actual supplemental enhancement information following the identifier may be transmitted in a byte string.

The supplemental enhancement information of the network parameter decoded in the supplemental enhancement information decoding apparatus 91 is input to the post-filter processing apparatus 61.

Note that, in an example of the present embodiment, syntax with SEI is described; however, the SEI is not restrictive, and syntax such as the SPS, the PPS, the APS, and the slice header may be used.

In the present embodiment, in such a configuration, even in a case that a transmission rate is low, a method for enabling improvement of image quality and efficient coding and decoding of the supplemental enhancement information regardless of a prediction structure is provided.

Application Examples

The video coding apparatus 10 and the video decoding apparatus 30 described above can be utilized being installed to various apparatuses performing transmission, reception, recording, and reconstruction of videos. Note that the video may be a natural video imaged by a camera or the like, or may be an artificial video (including CG and GUI) generated by a computer or the like.

SEI Payload

FIG. 9 is a diagram illustrating syntax of an SEI payload being a container of the SEI message.

nal_unit_type is called in a case of PREFIX_SEI_NUT. PREFIX_SEI_NUT indicates that SEI is SEI located before slice data.

In a case that payloadType is 210, the neural network post-filter characteristics SEI is called.

In a case that payloadType is 211, the neural network post-filter activation SEI is called.

Decoding of SEI and Post-Filter Processing

The header decoder 3020 reads the SEI payload being a container of the SEI message, and decodes the neural network post-filter characteristics SEI message. For example, the header decoder 3020 decodes nnpfc_id, nnpfc_mode_idc, nnpfc_formatting_and_purpose_flag, nnpfc_purpose, nnpfc_reserved_zero_bit_a, nnpfc_uri_tag[i], nnpfc_uri[i], nnpfc_reserved_zero_bit_b, and nnpfc_payload_byte[i].

Figure 10:
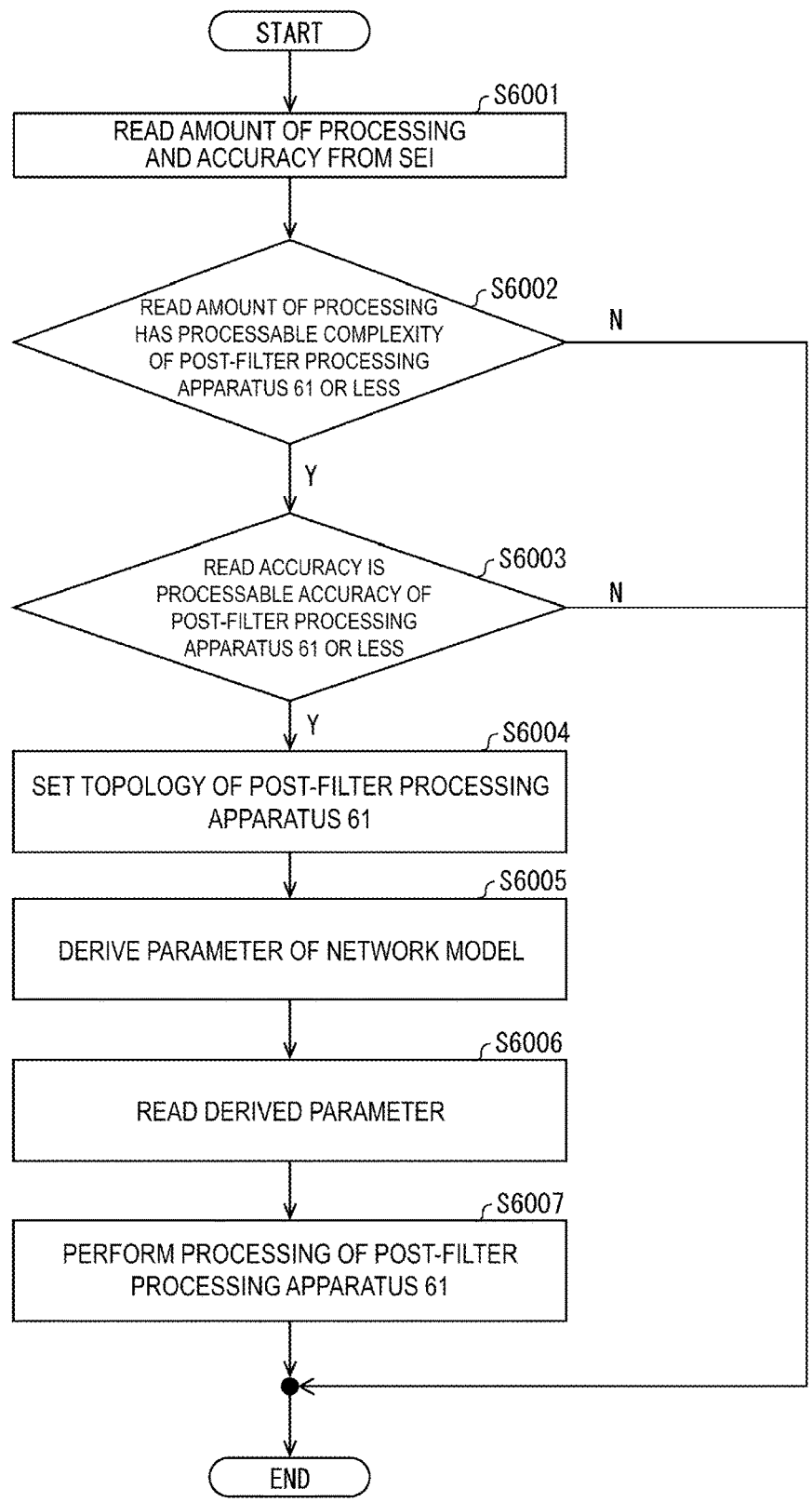
FIG. 10 is a diagram illustrating a flowchart of processing of a post-filter processing apparatus 61.

FIG. 10 is a diagram illustrating a flowchart of processing of the post-filter processing apparatus 61. The post-filter processing apparatus 61 performs the following processing in accordance with parameters of the SEI message.

S6001: Read the amount of processing and accuracy from the SEI.

S6002: End in a case that the amount of post-processing has complexity exceeding processable complexity. In a case that it does not exceed the processable complexity, proceed to S6003.

S6003: End in a case that the accuracy exceeds processable accuracy of the post-filter processing apparatus 61. In a case that it does not exceed the processable accuracy, proceed to S6004.

S6004: Identify a network model from the SEI, and set topology of the post-filter processing apparatus 61.

S6005: Derive the parameters of the network model from update information of the SEI.

S6006: Read the derived parameters of the network model in the post-filter processing apparatus 61.

S6007: Perform filter processing of the post-filter processing apparatus 61, and output to the outside.

Note that the SEI is not necessarily required for construction of a luminance sample and a chrominance sample in decoding processing. Details of Post-Filter Processing Apparatus 61

An NN filter unit performs the filter processing by the neural network model, using an input image inputTensor and input parameters (for example, QP, bS, and the like). The input image may be an image for each component, or may be an image having multiple components respectively as channels. The input parameters may be assigned to a different channel from the image.

The NN filter unit may repeatedly apply the following processing.

The NN filter unit performs convolution operation (conv, convolution) of a kernel k[m][i][j] on inputTensor, and derives an output image outputTensor to which bias is added. Here, nn=0 . . . n−1, xx=0 . . . width−1, and yy=0 . . . height−1, and 2 represents the sum for each of mm, i, and j.

$$outputTensor[nn][xx][yy] =$$

$$\sum\sum\sum (k[mm][i][j] * inputTensor[mm][xx + i - of][yy + j - of] + bias[nn])$$

In a case of 1×1 Conv, Σ represents the sum for each of mm=0 . . . m−1, i=0, and j=0. In this case, of =0 is set. In a case of 3×3 Conv, Σ represents the sum for each of mm= 0 . . . m−1, i=0 . . . 2, and j=0 . . . 2. In this case, of =1 is set. n represents the number of channels of outSamples, m represents the number of channels of inputTensor, width represents the width of inputTensor and outputTensor, and height represents the height of inputTensor and outputTensor. of represents the size of a padding area provided around inputTensor in order to make inputTensor and outputTensor have the same size. In the following, in a case that output of the NN filter unit is a value (correction value) instead of an image, corrNN is used to represent output instead of outputTensor.

Note that, in a case of description using inputTensor and outputTensor of the CHW format instead of inputTensor and outputTensor of the CWH format, it is equivalent to the following processing.

$$outputTensor[nn][yy][xx] =$$

$$\sum\sum\sum (k[mm][i][j] * inputTensor[mm][yy + j - of][xx + i - of] + bias[nn])$$

Processing shown by the following expression referred to as Depth wise Conv may be performed. Here, nn=0 . . . n−1, xx=0 . . . width−1, and yy=0 . . . height−1, and Σ represents the sum for each of i and j. n represents the number of channels of outputTensor and inputTensor, width represents the width of inputTensor and outputTensor, and height represents the height of inputTensor and outputTensor.

$$outputTensor[nn][xx][yy] =$$

$$\sum\sum (k[nn][i][j] * inputTensor[nn][xx + i - of][yy + j - of] + bias[nn])$$

Non-linear processing referred to as Activate, such as ReLU, may be used.

$$ReLU(x) = x >= 0 ? x : 0$$

leakyReLU shown in the following expression may be used.

$$leakyReLU(x) = x >= 0 ? x : a * x$$

Here, a is a prescribed value, for example, 0.1 or 0.125. In order to perform integer arithmetic, all of the above values of k, bias, and a may be integers, and right shifting may be performed after conv.

In ReLU, for values less than 0, 0 is invariably output, and for values equal to or greater than 0, an input value is directly output. In contrast, in leakyReLU, for values less than 0, linear processing is performed with a gradient being set equal to a. In ReLU, the gradient for values less than 0 disappears, and learning may not advance steadily. In leakyReLU, the gradient for values less than 0 remains, and thus the above problem is less easily caused. Of above leakyReLU(x), PRELU using a parameterized value of a may be used.

NNC

Neural Network Coding (NNC) is international standard ISO/IEC 15938-17 for efficiently compressing a neural network (NN). Compressing a learned NN enables to enhance efficiency in storing and transmitting the NN.

In the following, an overview of coding and decoding processing of NNC will be described.

Figure 11:
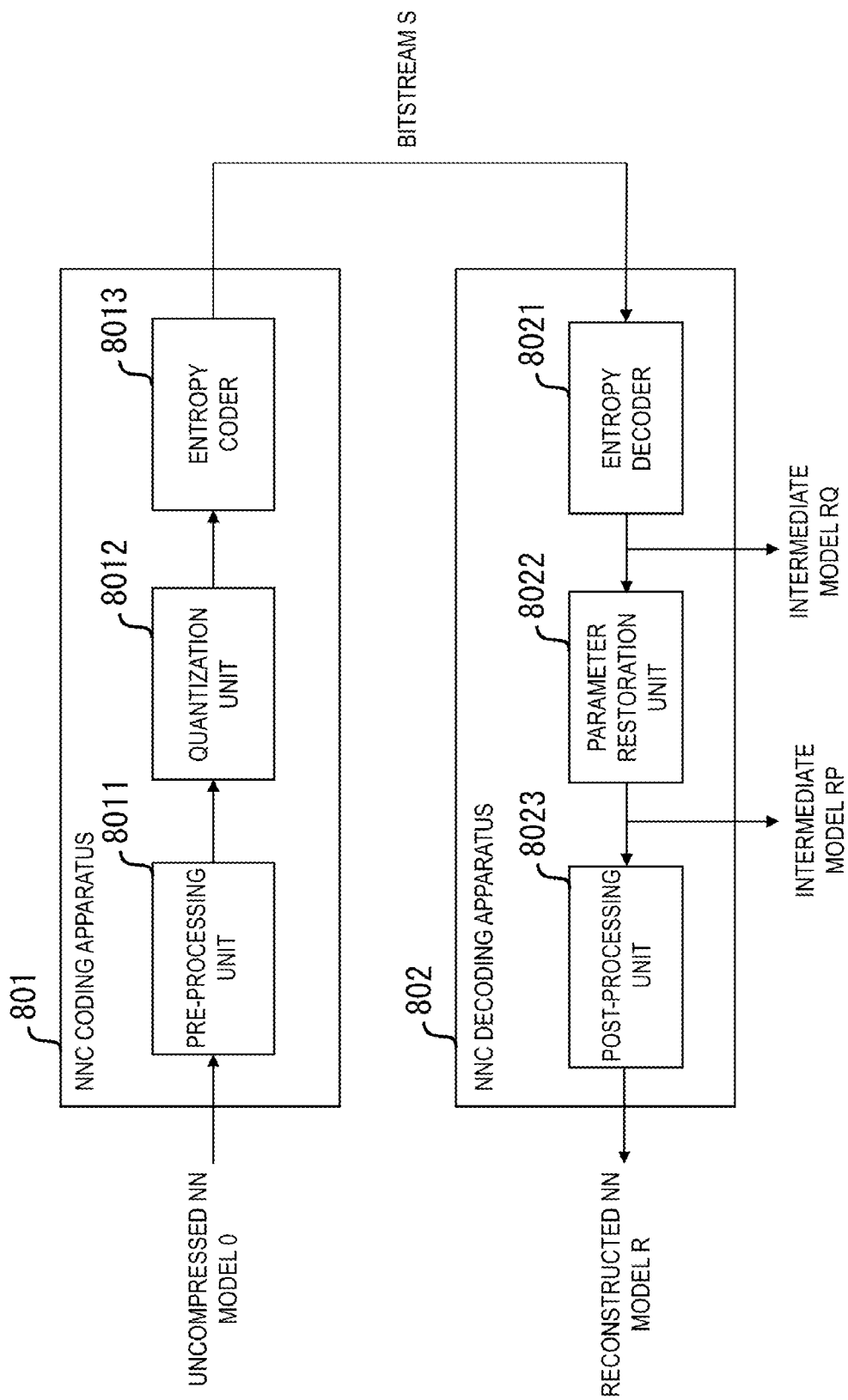
FIG. 11 is a diagram illustrating a coding apparatus and a decoding apparatus of NNC.

FIG. 11 is a diagram illustrating a coding apparatus and a decoding apparatus of NNC.

An NN coding apparatus 801 includes a pre-processing unit 8011, a quantization unit 8012, and an entropy coder 8013. The NN coding apparatus 801 inputs an uncompressed NN model O, performs quantization of the NN model O in the quantization unit 8012, and derives a quantized model Q. Before the quantization, the NN coding apparatus 801 may repeatedly apply parameter reduction methods in the pre-processing unit 8011, such as pruning and sparse representation. Subsequently, in the entropy coder 8013, entropy coding is applied to the quantized model Q, and a bitstream S for storing and transmitting the NN model is derived.

An NN decoding apparatus 802 includes an entropy decoder 8021, a parameter restoration unit 8022, and a post-processing unit 8023. The NN decoding apparatus 802 first inputs the transmitted bitstream S, and in the entropy decoder 8021, performs entropy decoding of S and derives an intermediate model RQ. In a case that an operating environment of the NN model supports inference using a quantization representation used in RQ, RQ may be output and used for the inference. Otherwise, parameters of RQ are restored to the original representation in the parameter restoration unit 8022, and an intermediate model RP is derived. In a case that a sparse tensor representation to be used can be processed in the operating environment of the NN model, RP may be output and used for the inference. Otherwise, a tensor different from the NN model O or a reconfiguration NN model R not including a structural representation is derived and output.

In the NNC standard, there are decoding schemes for numerical representation of specific NN parameters, such as integers and floating points.

With a decoding scheme NNR_PT_INT, a model including a parameter of an integer value is decoded. With a decoding scheme NNR_PT_FLOAT, NNR_PT_INT is enhanced, and a quantization step size delta is added. delta is multiplied by the integer value, and a scaled integer is thereby generated. delta is derived as follows, using a quantization parameter qp of an integer and a granularity parameter qp_density of delta.

$$mul = 2^{\wedge}(\text{qp\_density}) + (qp \, \& (2^{\wedge}(\text{qp\_density}) - 1))$$

$$\text{delta} = mul * 2^{\wedge}((qp >> \text{qp\_density}) - \text{qp\_density})$$

Format of Learned NN

Representation of a learned NN includes two elements, i.e., topology representation such as the size of each layer and connection between the layers and parameter representation such as the weight and the bias.

The topology representation is covered by native formats such as TensorFlow (trade name) and PyTorch (trade name); however, for the sake of enhancement of interoperability, there are exchange formats such as an Open Neural Network Exchange Format (ONNX) (trade name) and a Neural Network Exchange Format (NNEF).

In the NNC standard, topology information nnr_topology_unit_payload is transmitted as a part of an NNC bitstream including a compressed parameter tensor. This allows for implementation of interoperation with topology information represented not only in an exchange format but also in a native format.

Configuration of Image Coding Apparatus

Figure 6:
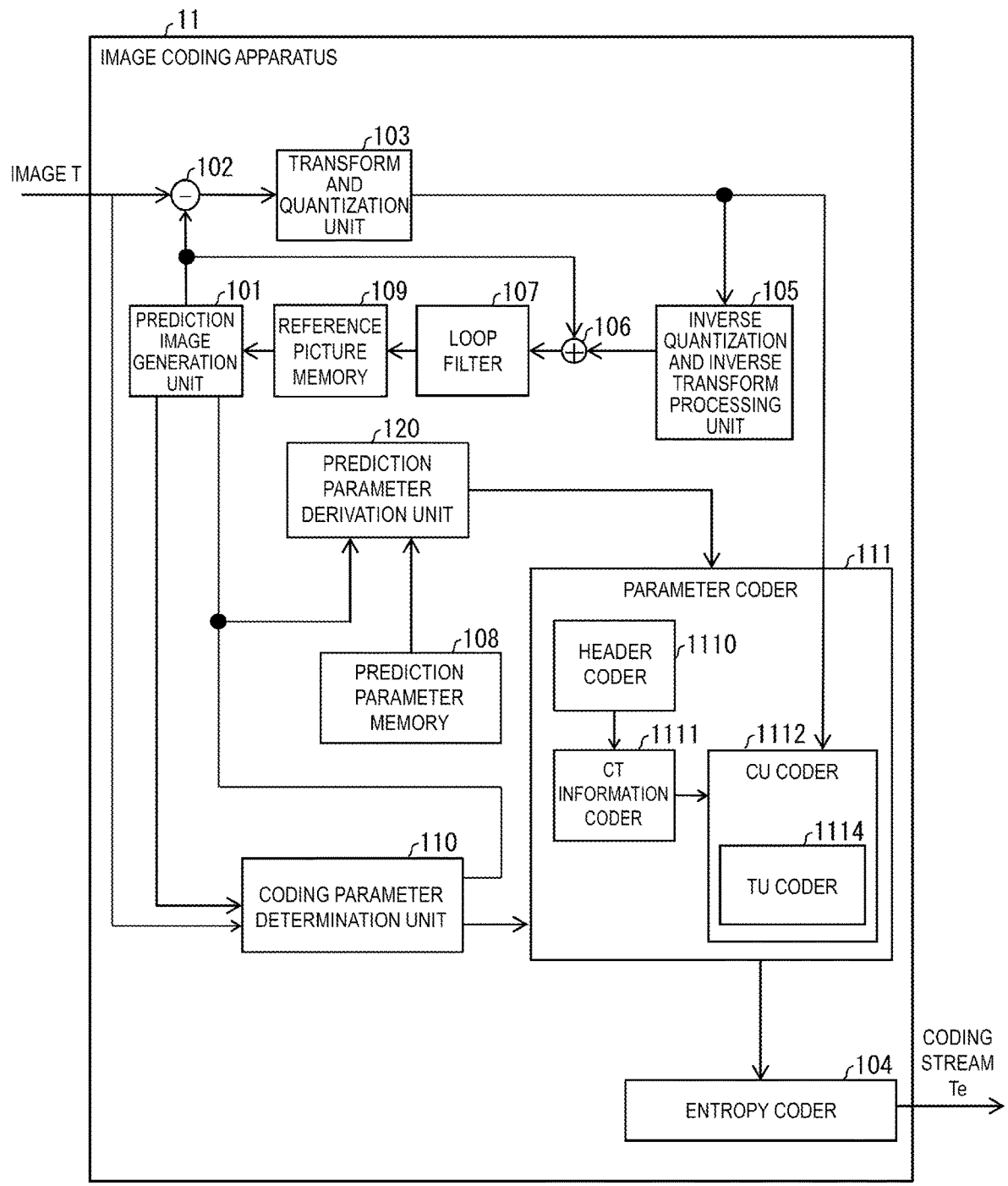
FIG. 6 is a block diagram illustrating a configuration of an image coding apparatus.

Next, a configuration of the image coding apparatus 11 according to the present embodiment will be described. FIG. 6 is a block diagram illustrating a configuration of the image coding apparatus 11 according to the present embodiment. The image coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, a prediction parameter derivation unit 120, and an entropy coder 104.

The prediction image generation unit 101 generates a prediction image for each CU.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization. The transform and quantization unit 103 outputs the quantized transform coefficient to the parameter coder 111 and the inverse quantization and inverse transform processing unit 105.

The inverse quantization and inverse transform processing unit 105 is the same as the inverse quantization and inverse transform processing unit 311 (FIG. 6) in the image decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as header information, split information, prediction information, and quantized transform coefficients.

The CT information coder 1111 encodes the QT and MT (BT, TT) split information and the like.

The CU coder 1112 encodes the CU information, the prediction information, the split information, and the like.

In a case that a prediction error is included in the TU, the TU coder 1114 encodes the QP update information and the quantization prediction error.

The CT information coder 1111 and the CU coder 1112 supply, to the parameter coder 111, syntax elements such as an inter prediction parameter and the quantized transform coefficient.

The parameter coder 111 inputs the quantized transform coefficient and the coding parameters to the entropy coder 104. The entropy coder 104 entropy-codes these to generate the coded data Te and outputs the coded data Te.

The prediction parameter derivation unit 120 derives the inter prediction parameter and an intra prediction parameter from the parameters input from the coding parameter determination unit 110. The inter prediction parameter and intra prediction parameter derived are output to the parameter coder 111.

The addition unit 106 adds together, for each pixel, a pixel value for the prediction block input from the prediction image generation unit 101 and a prediction error input from the inverse quantization and inverse transform processing unit 105, generating a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates the prediction image by using these coding parameters.

Note that a computer may be used to implement some of the image coding apparatus 11 and the image decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, a parameter coder 111, and the prediction parameter derivation unit 120. In that case, this configuration may be realized by recording a program for realizing such control functions on a computer-readable recording medium and causing a computer system to read and perform the program recorded on the recording medium. Note that the "computer system" mentioned here refers to a computer system built into either the image coding apparatus 11 or the image decoding apparatus 31 and is assumed to include an OS and hardware components such as a peripheral apparatus. A "computer-readable recording medium" refers to a portable medium such as a flexible disk, a magneto-optical disk, a ROM, and a CD-ROM, and a storage apparatus such as a hard disk built into the computer system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. The above-described program may be one for implementing a part of the above-described functions, and also may be one capable of implementing the above-described functions in combination with a program already recorded in a computer system.

Part or all of the image coding apparatus 11 and the image decoding apparatus 31 in the embodiments described above may be realized as an integrated circuit such as a Large Scale Integration (LSI). Each function block of the image coding apparatus 11 and the image decoding apparatus 31 may be individually realized as processors, or part or all may be integrated into processors. The circuit integration technique is not limited to LSI, and may be realized as dedicated circuits or a multi-purpose processor. In a case that, with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiment and various amendments can be made to a design that fall within the scope that does not depart from the gist of the present invention.

To describe the present embodiment based on FIG. 1, the video coding apparatus 10 includes the image coding apparatus 11 that encodes an input image, the supplemental enhancement information generating apparatus 71 that generates information for determining an input format of a decoded image for luminance and chrominance to be input in post-filter processing and an input format of a strength control value obtained in a process of generating the decoded image, and the supplemental enhancement information coding apparatus 81 that encodes the supplemental enhancement information.

The video decoding apparatus 30 includes the image decoding apparatus 31 that decodes an image from coded data, and the post-filter processing apparatus 61 that performs post-filter processing on a decoded image for the image decoded in the image decoding apparatus 31. In accordance with an input format for luminance and chrominance of the decoded image decoded in the supplemental enhancement information decoding apparatus 91 to be input in post-filter processing, the post-filter processing apparatus 61 transforms a strength control value obtained in a process of generating the decoded image in the image decoding apparatus 31, and performs the post-filter processing.

The embodiment of the present invention is not limited to the above-described embodiment, and various modifications are possible within the scope of the claims. That is, an embodiment obtained by combining technical means modified appropriately within the scope of the claims is also included in the technical scope of the present invention.

INDUSTRIAL APPLICABILITY

The embodiment of the present invention can be preferably applied to a video decoding apparatus that decodes coded data in which image data is encoded, and a video coding apparatus that generates coded data in which image data is coded. The embodiment of the present invention can be preferably applied to a data structure of coded data generated by the video coding apparatus and referred to by the video decoding apparatus.

REFERENCE SIGNS LIST

1 Video transmission system
30 Video decoding apparatus
31 Image decoding apparatus
301 Entropy decoder
302 Parameter decoder
305, 107 Loop filter
306, 109 Reference picture memory
307, 108 Prediction parameter memory
308, 101 Prediction image generation unit
311, 105 Inverse quantization and inverse transform processing unit
312, 106 Addition unit
320 Prediction parameter derivation unit
10 Video coding apparatus
11 Image coding apparatus
102 Subtraction unit
103 Transform and quantization unit
104 Entropy coder
110 Coding parameter determination unit
111 Parameter coder
120 Prediction parameter derivation unit
41 Image display apparatus
51 Pre-filter processing apparatus
61 Post-filter processing apparatus
71 Supplemental enhancement information generating apparatus
81 Supplemental enhancement information coding apparatus 91 Supplemental enhancement information decoding apparatus

The invention claimed is:

1. A video decoding apparatus for decoding a neural network post-filter characteristics SEI message, the video decoding apparatus comprising:
   a decoder that decodes a first syntax element, related to an input value of a neural network, in the neural network post-filter characteristics SEI message; and
   a supplemental enhancement information decoder that derives strength control information by using the first syntax element, wherein
   (i) in a case that a value of the first syntax element is equal to a first value, the strength control information is derived by using bit-depth for luminance, and
   (ii) in a case that the value of the first syntax element is equal to a second value, the strength control information is set to be equal to a value derived by using a quantization parameter.

2. The video decoding apparatus according to claim 1, wherein
   the supplemental enhancement information decoder decodes a second syntax element, indicating a method of ordering a pixel array of an input image related to an input tensor, in the neural network post-filter characteristics SEI message,
   a value of the second syntax element being equal to a third value indicates presence of a luminance matrix in the input tensor,
   the value of the second syntax element being equal to a fourth value indicates presence of a chrominance matrix in the input tensor,
   if (i) the value of the first syntax element is equal to the first value, and (ii) the value of the second syntax element is equal to the third value, the strength control information is derived by using the bit-depth for luminance, and
   if (i) the value of the first syntax element is equal to the first value, and (ii) the value of the second syntax element is equal to the fourth value, the strength control information is derived by using the bit-depth for chrominance.

3. The video decoding apparatus according to claim 2, wherein
   the value of the second syntax element being equal to a fifth value or a sixth value indicates presence of the luminance matrix and the chrominance matrix in the input tensor, and
   in the case that (i) the value of the first syntax element is equal to the first value, and (ii) the value of the second syntax element is equal to the fifth value or the sixth value, the strength control information is derived by using the bit-depth for luminance.

4. A video coding apparatus for encoding a neural network post-filter characteristics SEI message, the video coding apparatus comprising:
   a coder that encodes a first syntax element, related to an input value of a neural network, in the neural network post-filter characteristics SEI message; and
   a supplemental enhancement information coder that derives strength control information by using the first syntax element, wherein
   (i) in a case that a value of the first syntax element is equal to a first value, the strength control information is derived by using bit-depth for luminance, and
   (ii) in a case that the value of the first syntax element is equal to a second value, the strength control information is set to be equal to a value derived by using a quantization parameter.

5. The video coding apparatus according to claim 4, wherein
   the supplemental enhancement information coder encodes a second syntax element, indicating a method of ordering a pixel array of an input image related to an input tensor, in the neural network post-filter characteristics SEI message,
   a value of the second syntax element being equal to a third value indicates presence of a luminance matrix in the input tensor,
   the value of the second syntax element being equal to a fourth value indicates presence of a chrominance matrix in the input tensor,
   if (i) the value of the first syntax element is equal to the first value, and (ii) (ii) the value of the second syntax element is equal to the third value, the strength control information is derived by using the bit-depth for luminance, and
   if (i) the value of the first syntax element is equal to the first value, and (ii) the value of the second syntax element is equal to the fourth value, the strength control information is derived by using the bit-depth for chrominance.

6. The video coding apparatus according to claim 5, wherein
   the value of the second syntax element being equal to a fifth value or a sixth value indicates presence of the luminance matrix and the chrominance matrix in the input tensor, and
   in the case that (i) the value of the first syntax element is equal to the first value, and (ii) the value of the second syntax element is equal to the fifth value or the sixth value, the strength control information is derived by using the bit-depth for luminance.

7. A video decoding method for decoding a neural network post-filter characteristics SEI message, the video decoding method including:
   decoding a first syntax element, related to an input value of a neural network, in the neural network post-filter characteristics SEI message; and
   deriving strength control information by using the first syntax element, wherein
   the strength control information is derived by using bit-depth for luminance, in a case that a value of the first syntax element is equal to a first value, and
   the strength control information is derived by using a quantization parameter, in a case that the value of the first syntax element is equal to a second value.

8. A video coding method for encoding a neural network post-filter characteristics SEI message, the video coding method including:
   encoding a first syntax element, related to an input value of a neural network, in the neural network post-filter characteristics SEI message; and
   deriving strength control information by using the first syntax element, wherein
   the strength control information is derived by using bit-depth for luminance, in a case that a value of the first syntax element is equal to a first value, and
   the strength control information is derived by using a quantization parameter, in a case that the value of the first syntax element is equal to a second value.

* * * * *